United States Patent
Tanoue et al.

[19]

[11] Patent Number: 6,091,688
[45] Date of Patent: Jul. 18, 2000

[54] REPRODUCING APPARATUS BY GENERATING SLICE LEVEL AT HEADER FIELD OF THE OPTICAL DISK

[75] Inventors: Koki Tanoue; Hideaki Osawa, both of Yokohama, Japan

[73] Assignee: Kabushiki Kaisha Toshiba, Kawasaki, Japan

[21] Appl. No.: 09/167,555

[22] Filed: Oct. 8, 1998

[30] Foreign Application Priority Data

Oct. 8, 1997 [JP] Japan ..................... 9-275515

[51] Int. Cl.[7] ........................................ G11B 3/90
[52] U.S. Cl. .............................. 369/59; 369/275.3
[58] Field of Search ............... 369/58, 59, 275.3, 369/54, 275.2, 47, 48, 32, 44.26

[56] References Cited

U.S. PATENT DOCUMENTS

| | | | |
|---|---|---|---|
| 5,444,682 | 8/1995 | Yamada et al. | 369/32 |
| 5,444,688 | 8/1995 | Fuji | 369/59 |
| 5,592,456 | 1/1997 | Miyashita et al. | 369/59 |
| 5,717,672 | 2/1998 | Furukawa et al. | 369/50 |
| 5,745,460 | 4/1998 | Tateishi | 369/58 |
| 5,745,463 | 4/1998 | Maegawa et al. | 369/59 |
| 5,754,506 | 5/1998 | Nagasawa et al. | 369/44.26 |
| 5,784,356 | 7/1998 | Hayashi et al. | 369/124 |
| 5,796,691 | 8/1998 | Furukawa et al. | 369/50 |
| 5,872,767 | 2/1999 | Nagai et al. | 369/275.3 |
| 5,920,534 | 7/1999 | Furuta et al. | 369/59 |
| 5,936,932 | 8/1999 | Nakane et al. | 369/275.3 |
| 5,966,356 | 10/1999 | Kawashima et al. | 369/48 |

*Primary Examiner*—Tan Dinh
*Attorney, Agent, or Firm*—Pillsbury Madison & Sutro LLP

[57] ABSTRACT

A reproducing apparatus which reproduces data recorded on an information recording medium. The reproducing apparatus is provided with a header field and a recording field. A synchronization code and address data are recorded in the header field. The reproducing apparatus generates a slice level signal based on a reproduce signal of the synchronization code obtained from the header field of the information recording medium. The reproducing apparatus reproduces the address data obtained from the header field by binarizing it based on the slice level signal.

3 Claims, 18 Drawing Sheets

|  | | ROTATION SPEED (Hz) | NUMBER OF SECTORS PER TRACK | NUMBER OF TRACKS |
|---|---|---|---|---|
| A1 | LEAD-IN AREA (EMBOSSED DATA ZONE) | 37.57 | 18 | 1896 |
| A1 | LEAD-IN AREA (MIRROR ZONE) | | | |
| A1 | LEAD-IN AREA (REWRITABLE DATA ZONE) | 39.78 | 17 | 1888 |
| A2 | DATA AREA (REWRITABLE DATA ZONE) ZONE 0 | 39.78 | 17 | |
| A2 | ZONE 1 | 37.57 | 18 | 1888 |
| A2 | ZONE 2 | 35.59 | 19 | 1888 |
| A2 | ZONE 3 | 33.81 | 20 | 1888 |
| A2 | ZONE 4 | 32.20 | 21 | 1888 |
| A2 | ZONE 5 | 30.74 | 22 | 1888 |
| A2 | ZONE 6 | 29.40 | 23 | 1888 |
| A2 | ZONE 7 | 28.18 | 24 | 1888 |
| A2 | ZONE 8 | 27.05 | 25 | 1888 |
| A2 | ZONE 9 | 26.01 | 26 | 1888 |
| A2 | ZONE 10 | 25.05 | 27 | 1888 |
| A2 | ZONE 11 | 24.15 | 28 | 1888 |
| A2 | ZONE 12 | 23.32 | 29 | 1888 |
| A2 | ZONE 13 | 22.54 | 30 | 1888 |
| A2 | ZONE 14 | 21.82 | 31 | 1888 |
| A2 | ZONE 15 | 21.13 | 32 | 1888 |
| A2 | ZONE 16 | 20.49 | 33 | 1888 |
| A2 | ZONE 17 | 19.89 | 34 | 1888 |
| A2 | ZONE 18 | 19.32 | 35 | 1888 |
| A2 | ZONE 19 | 18.79 | 36 | 1888 |
| A2 | ZONE 20 | 18.28 | 37 | 1888 |
| A2 | ZONE 21 | 17.80 | 38 | 1888 |
| A2 | ZONE 22 | 17.34 | 39 | 1888 |
| A2 | ZONE 23 | 16.91 | 40 | 1888 |
| A3 | LEAD-OUT AREA (REWRITABLE DATA ZONE) | 16.91 | 40 | 1446 |

FIG. 2

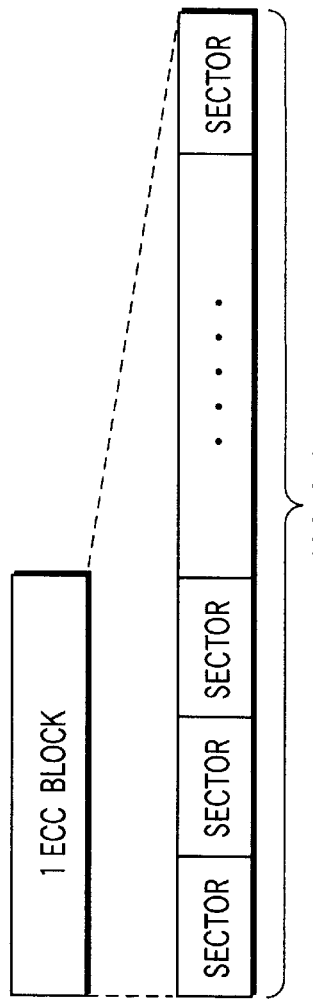
F I G. 4
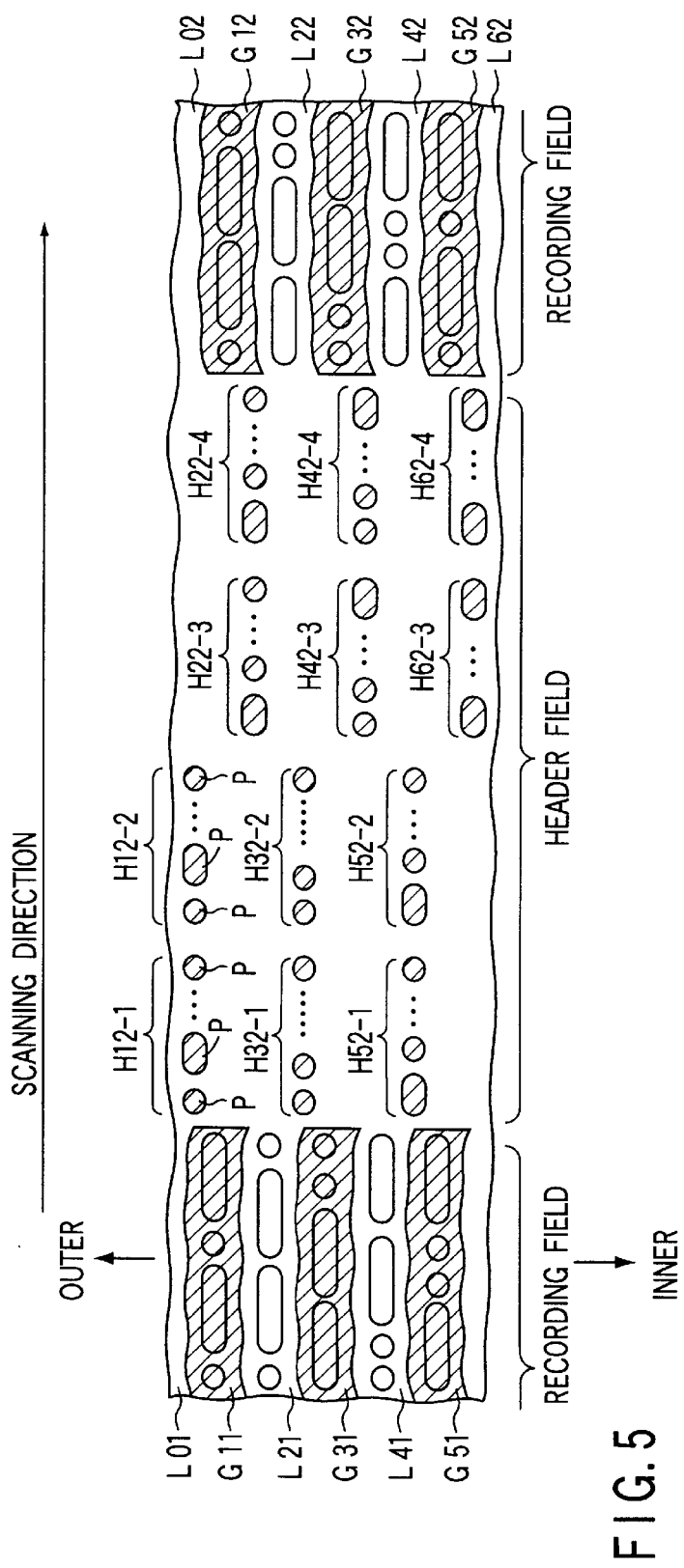
F I G. 5

| DATA SYMBOL | STATE 1 CODE WORD MSB — LSB | NEXT STATE | STATE 2 CODE WORD MSB — LSB | NEXT STATE | STATE 3 CODE WORD MSB — LSB | NEXT STATE | STATE 4 CODE WORD MSB — LSB | NEXT STATE |
|---|---|---|---|---|---|---|---|---|
| 0 | 0010000000001001 | 1 | 0100000100100000 | 2 | 0010000000001001 | 1 | 0100000100100000 | 2 |
| 1 | 0010000000010010 | 1 | 0010000000010010 | 1 | 1000000100100000 | 3 | 1000000100100000 | 3 |
| 2 | 0010000100100000 | 2 | 0010000100100000 | 2 | 1000000000010010 | 1 | 1000000000010010 | 1 |
| 3 | 0010000001001000 | 2 | 0100010010000000 | 4 | 0010000001001000 | 2 | 0100010010000000 | 4 |
| 4 | 0010000000010000 | 2 | 0010000010010000 | 2 | 1000000100100000 | 2 | 1000000100100000 | 2 |
| 5 | 0010000000100100 | 2 | 0010000000100100 | 2 | 1001001000000000 | 4 | 1001001000000000 | 4 |
| 6 | 0010000000100100 | 3 | 0010000000100100 | 3 | 1000100100000000 | 4 | 1000100100000000 | 4 |
| 7 | 0010000001001000 | 3 | 0100000001001000 | 3 | 0010000001001000 | 3 | 0100000001001000 | 3 |
| 8 | 0010000010010000 | 3 | 0010000010010000 | 3 | 1000010010000000 | 4 | 1000010010000000 | 4 |
| 9 | 0010000100100000 | 3 | 0010000100100000 | 3 | 1001001000000001 | 1 | 1001001000000001 | 1 |
| 10 | 0010010010000000 | 4 | 0010010010000000 | 4 | 1000100100000001 | 1 | 1000100100000001 | 1 |
| ... | ... | ... | ... | ... | ... | ... | ... | ... |
| 250 | 0000001001010010 | 1 | 0000001001010010 | 1 | 1000010010000010 | 1 | 1000010010000010 | 1 |
| 251 | 0000001001001010 | 1 | 0000010010001010 | 1 | 1000001001000001 | 1 | 1000001001000001 | 1 |
| 252 | 0000001001000001 | 1 | 0100001000001010 | 1 | 0000010010001001 | 1 | 0100010010000001 | 1 |
| 253 | 0000001000010001 | 1 | 0000010010001001 | 1 | 1001001001000001 | 1 | 1001001000001001 | 1 |
| 254 | 0000001001010100 | 2 | 0100001000010001 | 1 | 1001000000010010 | 2 | 0100010000001001 | 1 |
| 255 | 0000001000001000 | 2 | 0010001000010010 | 1 | 1000100010001000 | 2 | 0100001000010010 | 1 |

FIG. 12

| DATA SYMBOL | STATE 1 CODE WORD MSB — LSB | NEXT STATE | STATE 2 CODE WORD MSB — LSB | NEXT STATE | STATE 3 CODE WORD MSB — LSB | NEXT STATE | STATE 4 CODE WORD MSB — LSB | NEXT STATE |
|---|---|---|---|---|---|---|---|---|
| 0 | 000000100010000000 | 4 | 000001001000000000 | 4 | 010010001001000 | 2 | 010010001001000 | 2 |
| 1 | 000010010100000000 | 4 | 000010010100000000 | 4 | 010010001001000 | 3 | 010010001001000 | 3 |
| 2 | 000100100100000000 | 4 | 000100100100000000 | 4 | 010010000001001 | 1 | 010010000001001 | 1 |
| 3 | 000000010010000000 | 4 | 010010001001000 | 4 | 100000100000000 | 1 | 010010000000001 | 1 |
| 4 | 000000100010100000 | 3 | 010010000100100000 | 1 | 100010000000100 | 4 | 010010000000010 | 1 |
| 5 | 000000000100010000 | 3 | 010010000001000000 | 4 | 100010000000100 | 3 | 010010000000100 | 4 |
| 6 | 000000000001001000 | 3 | 010010000100100000 | 2 | 100010000000100 | 3 | 010010000100100 | 2 |
| 7 | 000000000001001000 | 2 | 010010000100010000 | 4 | 100010000000100 | 2 | 010010000100000 | 4 |
| 8 | 000000000010010000 | 2 | 010010001000010000 | 3 | 010010000000100 | 2 | 010010001010000 | 3 |
| 9 | 000000000100100000 | 2 | 010010000010000000 | 2 | 010010000001000 | 4 | 010010000010000 | 2 |
| 10 | 000000010001000000 | 4 | 000000010001000000 | 4 | 000000100001000000 | 4 | 100100010010000000 | 4 |
| ⋯ | ⋯ | ⋯ | ⋯ | ⋯ | ⋯ | ⋯ | ⋯ | ⋯ |
| 82 | 000100100001000100 | 2 | 000100100000000100 | 2 | 100000100001001000 | 2 | 100000100001001000 | 2 |
| 83 | 001001000000000100 | 2 | 001001000000100100 | 2 | 100000100010010000 | 2 | 100000100010010000 | 2 |
| 84 | 001001000000100100 | 2 | 001001000010010000 | 2 | 100010000000001000 | 2 | 100010000000001000 | 2 |
| 85 | 001001000010010000 | 2 | 001001000010010000 | 2 | 010000100001001001 | 1 | 010010001001001 | 1 |
| 86 | 000000010000100100 | 2 | 010000100010010000 | 2 | 100010000001000000 | 2 | 010010000100100 | 2 |
| 87 | 000000010010000100 | 2 | 010000100001000000 | 2 | 100010000010001000 | 2 | 010010001000000 | 2 |

FIG. 13

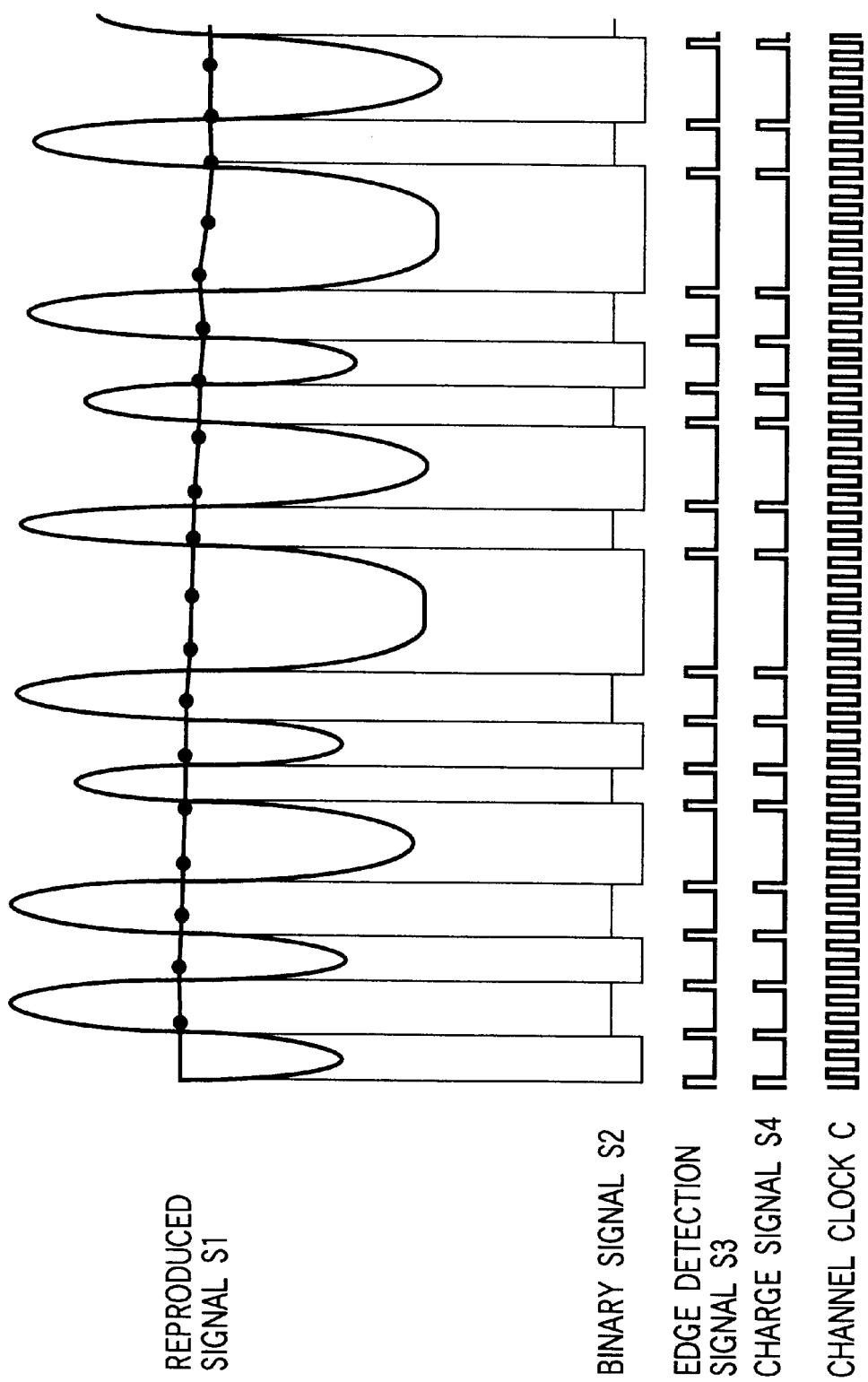
F I G. 18 ing 6,091,688

REPRODUCING APPARATUS BY GENERATING SLICE LEVEL AT HEADER FIELD OF THE OPTICAL DISK

BACKGROUND OF THE INVENTION

The present invention relates to an information recording medium which has a header field where header data is emboss-recorded in advance, and a recording field where recording data is phase-change-recorded. The present invention also relates to an information reproduction apparatus which binarizes a reproduced signal that reflects data recorded on an information recording medium by a predetermined slice level, and reproduces data recorded on the information recording medium on the basis of the binary reproduced signal.

In recent years, as large-capacity information recording media, optical disks such as a DVD (Digital Video Disk)-RAM (random access memory) and the like have been extensively studied. A DVD-RAM disk assures a large capacity by high-density recording. The DVD-RAM disk alternately has land and groove tracks in a spiral pattern, and data can be recorded on both the tracks.

The DVD-RAM disk has a header data area between the neighboring tracks, and also has a recording data field in the tracks. On the header data area, header data modulated by 8–16 modulation is emboss-recorded in advance (before delivery). Recording and reproduction to and from the recording field are done in accordance with the header data. User data modulated by 8–16 modulation is phase-change-recorded on the recording field.

A reproduction apparatus for reproducing a DVD-RAM disk binarizes a reproduced signal that reflects data recorded on the DVD-RAM disk by a predetermined slice level, and reproduces data based on the binary reproduced signal.

However, on the DVD-RAM disk, neighboring recorded data (neighboring header data) become too close to each other because of high-density recording. When the neighboring header data are too close to reproduce normally, recording and reproduction on the recording field are disabled.

Since 8–16 modulation is used, a cutting device for emboss-recording header data on the DVD-RAM disk is complicated.

Furthermore, the reproduction apparatus cannot always assure an appropriate slice level signal, and when the appropriate slice level signal cannot be assured, reproduction precision deteriorates.

BRIEF SUMMARY OF THE INVENTION

It is the first object of the present invention to provide an information recording medium which can prevent reproduction precision drop of header data resulting from high-density recording.

It is the second object of the present invention to provide an information recording medium which can simplify a cutting device.

Furthermore, it is the third object of the present invention to provide an information recording apparatus which can stably reproduce data.

An information recording medium and information reproduction apparatus according to the present invention have the following arrangements.

(1) An information recording medium of the present invention, which is formed into a disk shape, comprises a land-shaped header field containing first and second header data which are allocated not to interfere with each other, a groove track which defines a spiral pattern having a center of the disk as the center thereof, and is discontinuous in the presence of the header field, and a land track which defines a spiral pattern having the center of the disk as the center thereof, and extends along the groove track.

(2) An information recording medium of the present invention, which is formed into a disk shape, comprises a land-shaped header field containing header data, which is modulated by one modulation table, a groove track which defines a spiral pattern having a center of the disk as the center thereof, and is discontinuous in the presence of the header field, and a land track which defines a spiral pattern having the center of the disk as the center thereof, and extends along the groove track.

(3) An information reproduction apparatus of the present invention comprises extraction means for extracting a reproduced signal that reflects data recorded on the information recording medium, and reproduction means for generating a slice level signal on the basis of a predetermined signal included the reproduced signal extracted by the extraction means, generating a binary signal obtained by binarizing the reproduced signal based on the slice level signal, and reproducing the data recorded on the information recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a table showing the rotation speeds and the like corresponding to individual zones on the optical disk;

FIG. 4 is a view for explaining an ECC block;

FIG. 5 is a view for explaining header fields located between neighboring groove sectors and between neighboring land sectors;

FIG. 12 shows a modulation table (main table);

FIG. 13 shows a modulation table (sub table);

FIG. 18 is a chart showing the generation processes of a binary signal from a reproduced signal.

DETAILED DESCRIPTION OF THE INVENTION

The preferred embodiments of the present invention will be described hereinafter with reference to the accompanying drawings.

An optical disk (DVD-RAM disk) as an information recording medium will be described below with reference to FIGS. 1 to 9.

Figure 1:
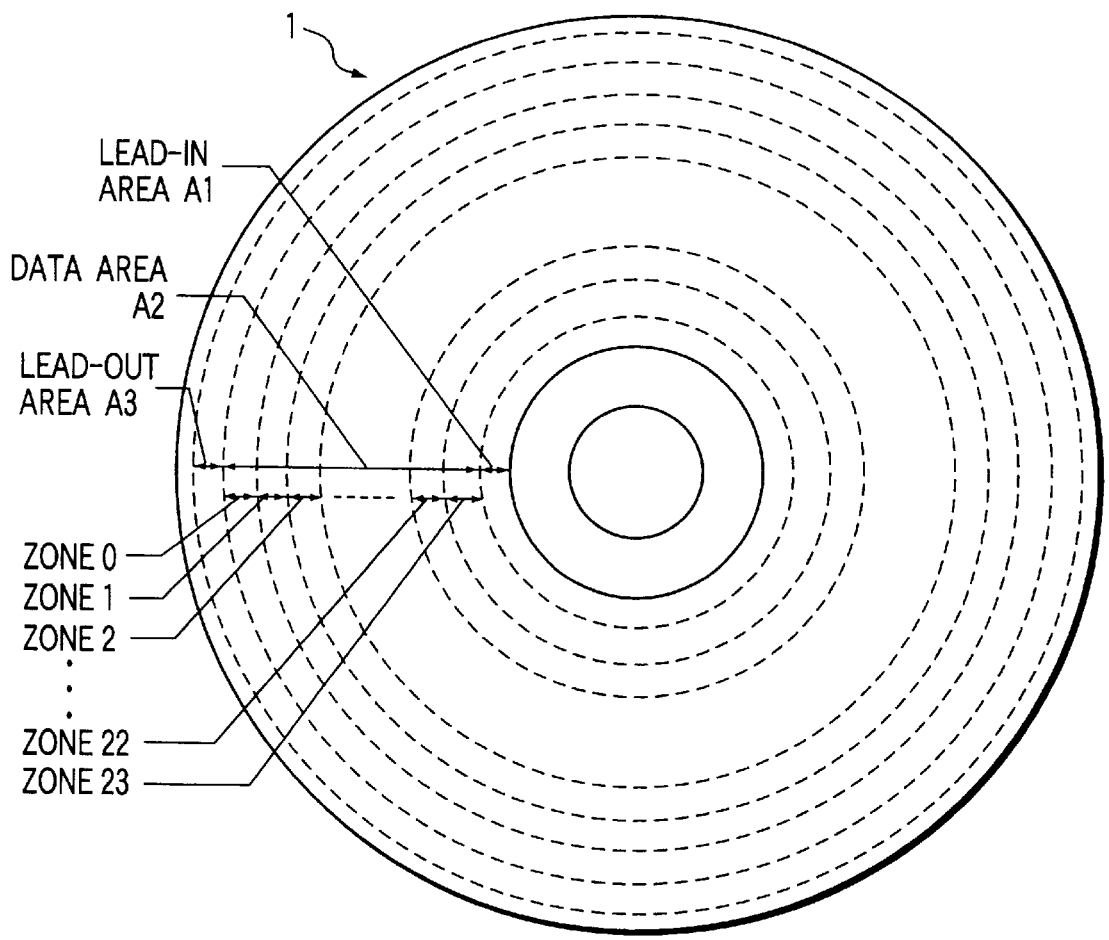
FIG. 1 is a plan view showing the layout of a lead-in area, data area, lead-out area, and the like on an optical disk.

FIG. 1 shows the layout of a lead-in area, data area, lead-out area, and the like on an optical disk. FIG. 2 is a table showing the rotation speeds and the like corresponding to individual zones on the optical disk.

As shown in FIGS. 1 and 2, a lead-in area A1, data area A2, and lead-out area A3 are located in turn from the inner periphery side on an optical disk 1. An emboss data zone, mirror zone (non-recording zone), and rewritable data zone are located on the lead-in area A1. A rewritable data zone is located on the data area A2, and has zones 0 to 23. The lead-out area A3 has a rewritable data zone.

On the emboss data zone of the lead-in area A1, a reference signal and control data are emboss-recorded in the manufacture of the optical disk 1. On the rewritable data zone of the lead-in area A1, the same data as that recorded on the rewritable data zone of the lead-in area A1 is recorded.

The emboss data zone located in the lead-in area A1 has 1,896 tracks, each of which consists of 18 sectors. This zone is processed at a rotation speed of 37.57 Hz.

The rewritable data zone located in the lead-in area A1 and zone 0 of the rewritable zone located in the data area A2 each has 1,888 tracks, each of which consists of 17 sectors. This zone is processed at a rotation speed of 39.78 Hz.

Zone 1 in the rewritable zone located in the data area A2 has 1,888 tracks, each of which consists of 18 sectors. This zone is processed at a rotation speed of 37.57 Hz.

Zone 2 in the rewritable zone located in the data area A2 has 1,888 tracks, each of which consists of 19 sectors. This zone is processed at a rotation speed of 35.59 Hz.

Likewise, zones 3 to 23 in the rewritable zone located in the data area A2 respectively have layouts shown in FIG. 2, and are processed at rotation speeds shown in FIG. 2.

The rewritable zone located in the lead-out area A3 has 1,446 tracks, each of which consists of 40 sectors. This zone is processed at a rotation speed of 16.91 Hz.

As described above, the number of sectors per track increases and the rotation speed decreases in turn from the zones on the inner periphery side of the optical disk 1. That is, the optical disk 1 uses a ZCLV (Zone Constant Linear Velocity) scheme.

Figure 3:
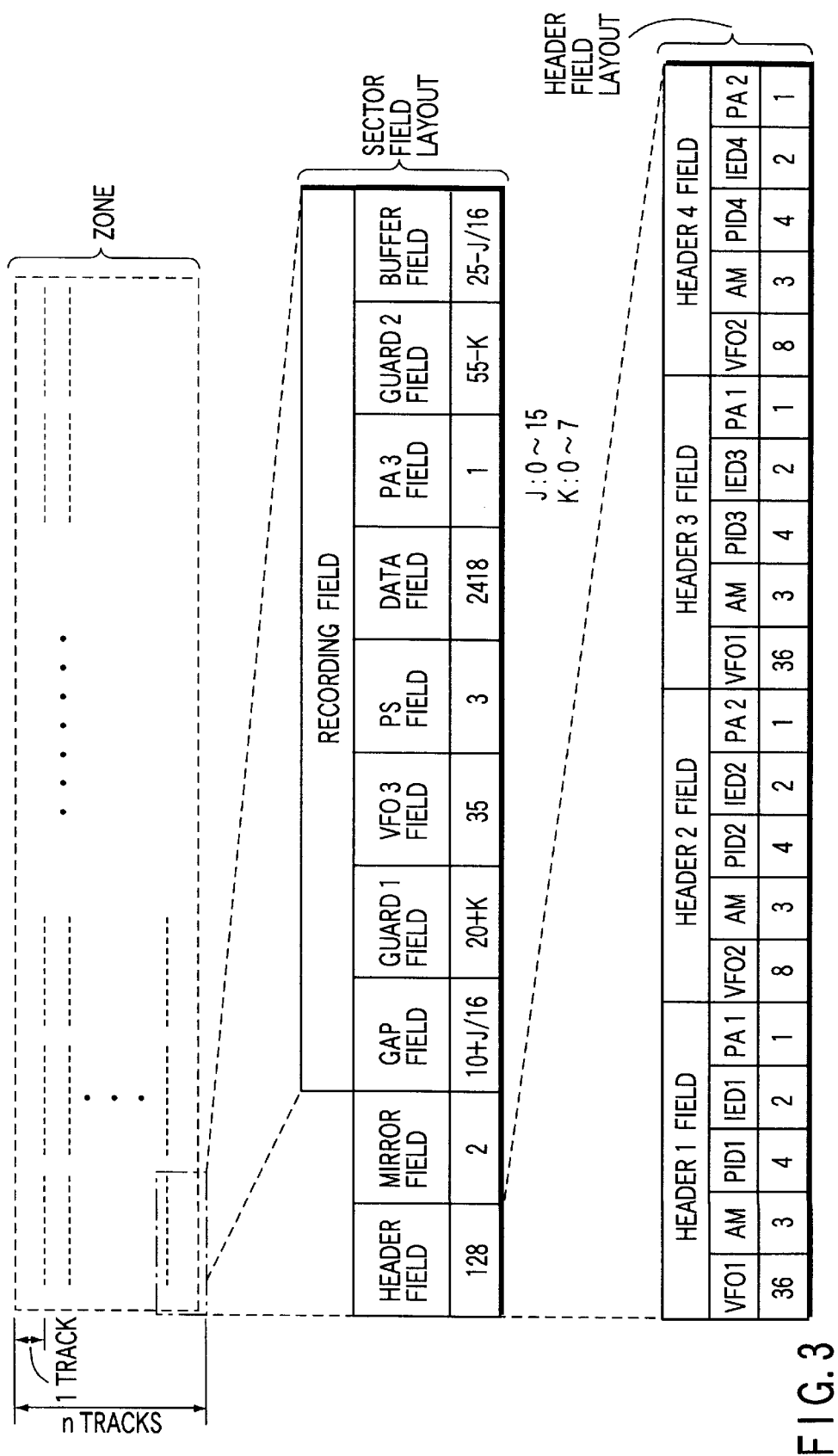
FIG. 3 shows the sector field layout and header field layout.

The sector field layout and header field layout will be explained below with reference to FIG. 3.

As described previously, each zone has a plurality of tracks, each of which consists of a plurality of sectors. One sector consists of approximately 2,697 bytes. The sector records data modulated by 8–16 modulation except for some sectors. The 8–16 modulation modulates an 8-bit input code sequence into a 16-bit output code sequence. The input code sequence is called input bits, and the output code sequence is called channel bits. Note that 1 byte means 16 channel bits.

The contents of one sector will be explained below. One sector is made up of a 128-byte header field, 2-byte mirror field, and 2,567-byte recording field. This sector can record 2,048-byte user data.

On the header field, header data is emboss-recorded (pre-formatted) in the manufacturing process of the optical disk. In this header field, the same header data is written four times to improve its detection precision. That is, the header field includes a header 1 field, header 2 field, header 3 field, and header 4 field, which record substantially the same data. Each of the header 1 field and header 3 field consists of 46 bytes. Each of the header 2 field and header 4 field consists of 18 bytes.

The header 1 field contains a 36-byte VFO (Variable Frequency Oscillator) 1 field, 3-byte AM (Address Mark) field, 4-byte PID (Physical ID) 1 field, 2-byte IED (ID Error Detection Code) 1 field, and 1-byte PA (Post Ambles) 1 field.

The header 2 field contains an 8-byte VFO 2 field, 3-byte AM field, 4-byte PID 2 field, 2-byte IED 2 field, and 1-byte PA 2 field.

The header 3 field contains a 36-byte VFO 1 field, 3-byte AM field, 4-byte PID 3 field, 2-byte IED 3 field, and 1-byte PA 1 field.

The header 4 field contains an 8-byte VFO 2 field, 3-byte AM field, 4-byte PID 2 field, 2-byte IED 2 field, and 1-byte PA 2 field.

The VFO field records a continuous repetitive pattern. With this repetitive pattern, even when the rotation of the disk varies, data can be reproduced reliably. More specifically, when the rotation of the disk varies, since the repetitive pattern in the VFO field also varies at the same time, data can be reliably reproduced by generating clocks used for reading out data by locking the PLL (Phase Locked Loop) to the repetitive pattern in the VFO field.

The PID field records address information. For example, a track number and sector number are recorded.

The AM field records a specific code pattern (runlength limitation violation pattern) indicating the code data read start position. That is, this specific code pattern indicates the position of the address information.

The IED field records a code for detecting errors of ID data in the PID field.

PA field records state information required for demodulation.

The recording field is processed in accordance with data recorded on the header field, and can record 2,048-byte user data. The user data recorded on this recording field are rewritable.

The recording field mainly records user data. The recording field is made up of a (10+J/16)-byte gap field, (20+K)- byte guard 1 field, 35-byte VFO 3 field, 3-byte PS (pre-synchronous code) field, 2,418-byte data field (user data field), 1-byte PA 3 field, (55−K)-byte guard 2 field, and (25−J/16)-byte buffer field. Note that J and K assume random integers respectively ranging from 0 to 15 and 0 to 7. With these values, the data write position is randomly shifted. As a consequence, a recording film can be prevented from deteriorating due to overwrite.

The gap field does not record any data.

The guard 1 field absorbs leading end deterioration as a result of repetitive overwrite which is unique to phase-change recording film.

The VFO 3 field records a continuous repetitive pattern. The reason for this is as described earlier.

The PS field records a synchronous code.

The data field records a data ID, data ID error correction code IED (Data ID Error Detection Code), synchronous code, ECC (Error Correction Code), EDC (Error Detection Code), user data, and the like. The data ID records one of sector IDs 1 to 16. This is because one ECC (error correction code) block consists of 16 sectors.

The PA 3 field contains state information required for demodulation, and indicates the end of the last byte of the previous data field.

The guard 2 field prevents trailing end deterioration upon repetitive recording unique to a phase-change recording medium from influencing the data field.

The buffer field absorbs variations of the rotation of the motor that rotates the optical disk 1 to prevent the data field from extending into the next header field.

The ECC block will be explained below with reference to FIG. 4.

ECC block data contain user data for 16 sectors, and longitudinal and vertical redundancy checking error correction codes for these user data for 16 sectors.

The ECC block data are divisionally recorded on the data fields of 16 sectors. That is, the ECC block is comprised of 16 sectors.

Header fields located between neighboring groove sectors (groove tracks) and between neighboring land sectors (land tracks) will be explained below with reference to FIGS. 5 and 6. The hatched portions in FIG. 5 have a groove shape, and all these portions have a constant depth.

The optical disk 1 has spiral tracks. The spiral tracks use a single spiral scheme with which land and groove tracks alternately appear every round. Strictly speaking, groove tracks form discontinuous tracks due to the presence of land-shaped header fields, as shown in FIG. 5. Land sectors are located on the land tracks, and groove sectors are located on the groove tracks.

Figure 6:
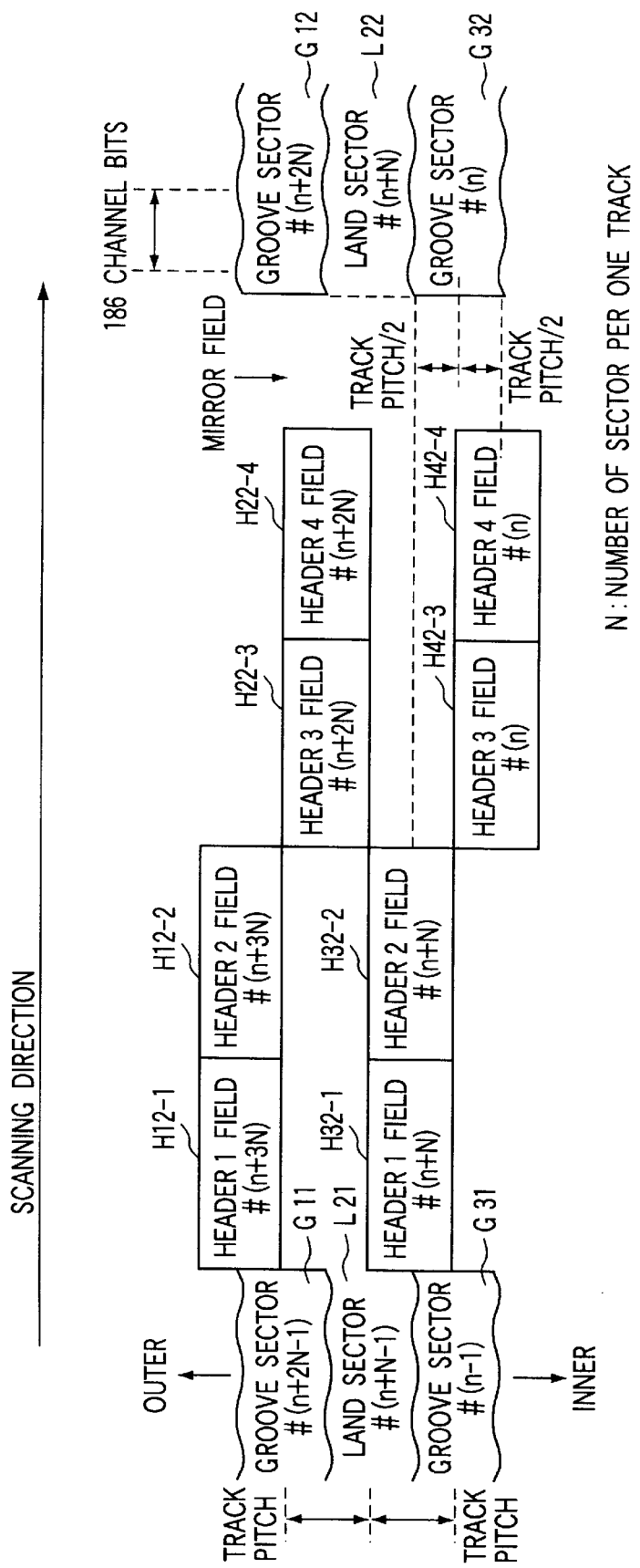
FIG. 6 is a view for explaining header fields located between neighboring groove sectors and between neighboring land sectors as in FIG. 5.

As shown in FIGS. 5 and 6, a land sector L01, groove sector G11, land sector L21, groove sector G31, land sector L41, and groove sector G51 are located on the recording field of the optical disk in turn from the outer periphery side toward the inner periphery side. Likewise, a land sector L02, groove sector L12, land sector L22, groove sector G32, land sector L42, and groove sector G52 are located on the recording field of the optical disk in turn from the outer periphery side toward the inner periphery side.

For example, the groove sectors G51 and G52 are located on the n-th groove track. The land sectors L41 and L42 are located on the (n+1)-th land track. The groove sectors G31 and G32 are located on the (n+3)-th land track. The groove sectors G11 and G12 are located on the (n+4)-th groove track. The land sectors L01 and L02 are located on the (n+5)-th land track.

The track pitch in FIG. 6 indicates the distance between the centers of neighboring tracks. That is, the distance from the center of the track where the land sector L21 is located to the center of the track where the groove sector G31 is located corresponds to the track pitch. Note that N in FIG. 6 represents the number of sectors per track (round). That is, N is an integer ranging from 17 to 40.

The header field is defined by a plurality of pits P, as shown in FIG. 5. Pits indicating data in a header 1 field H12-1 and header 2 field H12-2 are formed at positions along the extending line of the boundary between the (n+5)-th land track where the land sector L02 is located, and the (n+4)-th groove track where the groove sector G12 is located.

Pits indicating data in a header 3 field H22-3 and header 4 field H22-4 are formed at positions along the extending line of the boundary between the (n+4)-th groove track where the groove sector G12 is located, and the (n+3)-th land track where the land sector L22 is located.

Pits indicating data in a header 3 field H32-1 and header 2 field H32-2 are formed at positions along the extending line of the boundary between the (n+3)-th land track where the land sector L22 is located, and the (n+2)-th groove track where the groove sector G32 is located.

Pits indicating data in a header 3 field H42-3 and header 4 field H42-4 are formed at positions along the extending line of the boundary between the (n+2)-th groove track where the groove sector G32 is located, and the (n+1)-th land track where the land sector L42 is located.

Pits indicating data in a header 1 field H52-1 and header 2 field H52-2 are formed at positions along the extending line of the boundary between the (n+1)-th land track where the land sector L42 is located, and the n-th groove track where the groove sector G52 is located.

That is, the header 1 field and header 2 field, and the header 3 field and header 4 field, are located not to interfere with each other. In other words, the header 3 field and header 4 field are located at positions that do not neighbor the header 1 field and header 2 field. To put it differently, the header 3 field and header 4 field are located at positions separated from the regions of the header 1 field and header 2 field in the radial direction of the disk.

That is, as shown in FIGS. 5 and 6, by locating the header 1 field and header 2 field, and the header 3 field and header 4 field in a checkerboard pattern, the header 1 field and header 2 field can be prevented from interfering with the header 3 field and header 4 field. This layout can improve the reproduction precision of the header data.

The PIDs of headers in the header fields located between neighboring groove sectors have a relationship shown in FIG. 6. For example, the PID numbers of the respective headers located between the groove sectors G11 and G12 will be exemplified below. A header 1 field H12-1, header 2 field H12-2, header 3 field H22-3, and header 4 field H22-4 are located between the groove sectors G11 and G12. The PID number of the header field H12-1 is (n+3N), that of header 2 field H12-2 is (n+3N), that of header 3 field H22-3 is (n+2N), and that of the header 4 field H22-4 is (n+2N). That is, the PIDs of the respective headers located between the neighboring groove sectors satisfy (PID number header 1 field or header 2 field)>(PID number of header 3 field or header 4 field).

On the other hand, the PIDs of the respective headers of the header fields located between neighboring land sectors have a relationship shown in FIG. 6.

For example, the PID numbers of the respective headers located between the land sectors L21 and L22 will be exemplified below. A header 1 field H32-1, header 2 field H32-2, header 3 field H22-3, and header 4 field H22-4 are located between the land sectors L21 and L22.

The PID number of the header 1 field H32-1 is (n+N), that of the header 2 field H32-2 is (n+N), that of the header 3 field H22-3 is (n+2N), and that of the header 4 field H22-4 is (n+2N). That is, the PIDs of the respective headers located between the neighboring land sectors satisfy (PID number header 1 field or header 2 field)<(PID number of header 3 field or header 4 field).

That is, if (PID number header 1 field or header 2 field)>(PID number of header 3 field or header 4 field) upon reproduction of the header fields, it is determined that the sector (track) that follows this header is a groove sector (groove track). Then, reproduction is done according to tracking control corresponding to the groove sector (groove track).

By contrast, if (PID number header 1 field or header 2 field)<(PID number of header 3 field or header 4 field) upon reproduction of the header fields, it is determined that the sector (track) that follows this header is a land sector (land track). Then, reproduction is done according to tracking control corresponding to the land sector (land track).

Header fields located between a groove sector (groove track) and land sector (land track), i.e., at the boundary between a groove track and land track will be explained below with reference to FIGS. 7 and 8. The hatched portions in FIG. 8 indicate have a groove shape, and all these portions have a constant depth.

Figure 7:
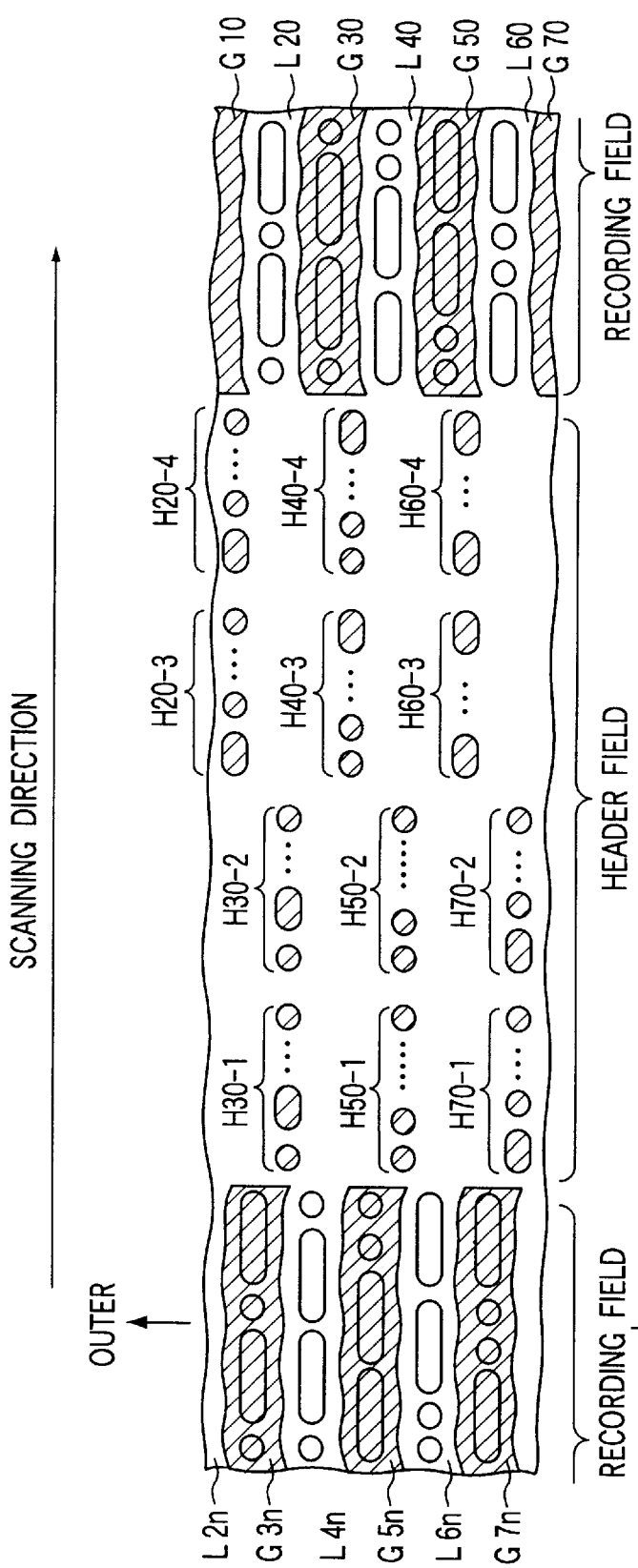
FIG. 7 is a view for explaining a header field located between groove and land sectors.
Figure 8:
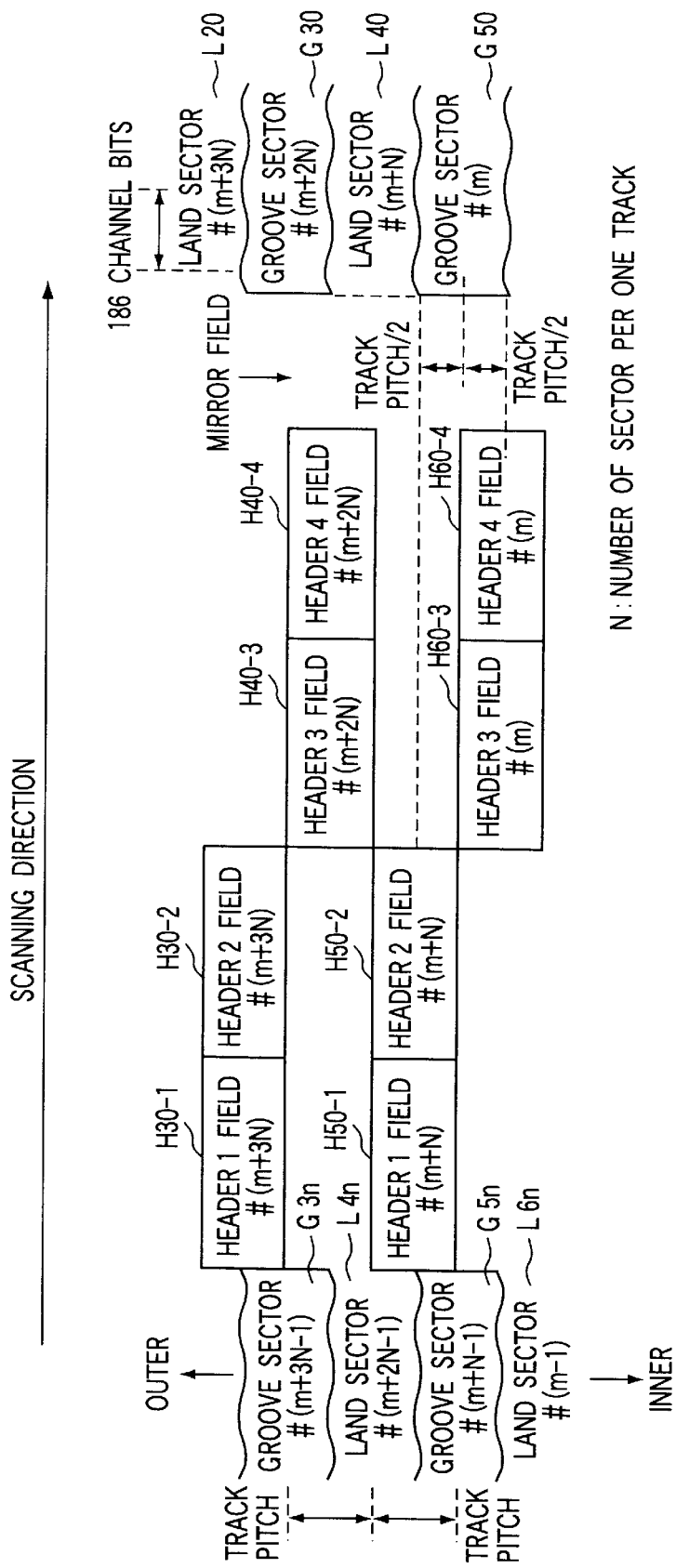
FIG. 8 is a view for explaining a header field located between groove and land sectors as in FIG. 7.

As shown in FIGS. 7 and 8, a groove sector L3n, land sector L4n, groove sector G5n, land sector L6n, and groove sector G7n are formed on the recording field of the optical disk in turn from the outer periphery side toward the inner periphery side. Likewise, a groove sector G10, land sector L20, groove sector G30, land sector L40, groove sector G50, land sector L60, and groove sector G70 are formed on the recording field of the optical disk in turn from the outer periphery side toward the inner periphery side.

For example, the groove sector G70 is located on the (n−2)-th groove track. By tracking this (n−2)-th groove track to its trailing end, the groove sector G7n is located at the trailing end of the (n−2)-th groove track.

The land sector L60 is located on the (n−1)-th land track. By tracking this (n−1)-th land track to its trailing end, the land sector L6n is located at the trailing end of the (n−1)-th land track.

The groove sector G50 is located on the n-th groove track. By tracking this n-th groove track, the groove sectors G51 and G52 shown in FIG. 5 are located in the middle of this track. Furthermore, by tracking the n-th groove track to its trailing end, the groove sector G5n is located at the trailing end of the n-th groove track.

The land sector L40 is located on the (n+1)-th land track. By tracking the (n+1)-th land track, the land sectors L41 and L42 shown in FIG. 5 are located in the middle of this track. By tracking this (n+1)-th land track to its trailing end, the land sector L4n is located at the trailing end of the (n+1)-th land track.

The groove sector G30 is located on the (n+2)-th groove track. By tracking this (n+2)-th groove track, the groove sectors G31 and G32 shown in FIG. 5 are located in the middle of this track. Furthermore, by tracking the (n+2)-th groove track to its trailing end, the groove sector G3n is located at the trailing end of the (n+2)-th groove track.

The land sector L20 is located on the (n+3)-th land track. By tracking the (n+3)-th land track, the land sectors L31 and L32 shown in FIG. 5 are located in the middle of this track. By tracking this (n+3)-th land track to its trailing end, the land sector L2n is located at the trailing end of the (n+3)-th land track.

The track pitch in FIG. 8 represents the distance between the centers of neighboring tracks. That is, the distance from the track where the land sector L4n is located to the center of the track where the groove sector G5n is located corresponds to the track pitch.

Note that N in FIG. 8 indicates the number of sectors per track (round). That is, N is an integer ranging from 17 to 40.

The header field is defined by a plurality of pits P, as shown in FIG. 7. Pits indicating data in a header 3 field H20-3 and header 4 field H20-4 are formed at positions along the extending line of the boundary between the (n+4)-th groove track where the groove sector G10 is located, and the (n+3)-th land track where the land sector L20 is located.

Pits indicating data in a header 1 field H30-1 and header 2 field H30-2 are formed at positions along the extending line of the boundary between the (n+3)-th land track where the land sector L20 is located, and the (n+2)-th groove track where the groove sector G30 is located.

Pits indicating data in a header 3 field H40-3 and header 4 field H40-4 are formed at positions along the extending line of the boundary between the (n+2)-th groove track where the groove sector G30 is located, and the (n+1)-th land track where the land sector L40 is located.

Pits indicating data in a header 1 field H50-1 and header 2 field H50-2 are formed at positions along the extending line of the boundary between the (n+1)-th land track where the land sector L40 is located, and the n-th groove track where the groove sector G50 is located.

Pits indicating data in header 3 field H60-3 and header 4 field H60-4 are formed at positions along the extending line of the boundary between the n-th groove track where the groove sector G50 is located, and the (n−1)-th land track where the land sector L60 is located.

Pits indicating data in a header 1 field H70-1 and header 2 field H70-2 are formed at positions along the extending line of the boundary between the (n−1)-th land track where the land sector L60 is located, and the (n−2)-th groove track where the groove sector G70 is located.

That is, the header 1 field and header 2 field, and the header 3 field and header 4 field, are located not to interfere with each other. In other words, the header 3 field and header 4 field are located at positions that do not neighbor the header 1 field and header 2 field. In different terms, the header 3 field and header 4 field are located at positions separated from the regions of the header 1 field and header 2 field in the radial direction of the disk.

More specifically, as shown in FIGS. 7 and 8, by locating the header 1 field and header 2 field, and the header 3 field and header 4 field in a checkerboard pattern, the header 1 field and header 2 field can be prevented from interfering with the header 3 field and header 4 field. This layout can improve the reproduction precision of the header data.

The PIDs of the respective headers in the header fields located between a land sector and groove sector (upon changing from a land track to the groove track) have a relationship shown in FIG. 8. For example, the PID numbers of the headers located between the land sector L4n and groove sector G30 will be exemplified below. A header 1 field H30-1, header 2 field H30-2, header 3 field H40-3, and header 4 field H40-4 are located between the land sector L4n and groove sector G30. The PID number of the header 1 field H30-1 is (m+3N), that of the header 2 field H30-2 is (m+3N), that of the header 3 field H40-3 is (m+2N), and that of the header 4 field H40-4 is (m+2N). That is, the PIDs of the respective headers located between the land sector and groove sector satisfy (PID number header 1 field or header 2 field)>(PID number of header 3 field or header 4 field).

On the other hand, the PIDs of the respective headers in the header fields located between the groove sector and land sector (upon changing from a groove track to a land track) have a relationship shown in FIG. 8. For example, the PID numbers of the headers located between the groove sector G5n and land sector L40 will be exemplified below. A header 1 field H50-1, header 2 field H50-2, header 3 field H40-3, and header 4 field H40-4 are located between the groove sector G3n and land sector L40. The PID number of the header 1 field H50-1 is (m+N), that of the header 2 field H50-2 is (m+N), that of the header 3 field H40-3 is (m+2N), and that of the header 4 field H40-4 is (m+2N). That is, the PIDs of the respective headers located between the land sector and groove sector satisfy (PID number header 1 field or header 2 field)<(PID number of header 3 field or header 4 field).

That is, if (PID number header 1 field or header 2 field)>(PID number of header 3 field or header 4 field) upon reproduction of the header fields, it is determined that the sector (track) that follows this header is a groove sector (groove track). Then, reproduction is done according to tracking control corresponding to the groove sector (groove track).

By contrast, if (PID number header 1 field or header 2 field)<(PID number of header 3 field or header 4 field) upon reproduction of the header fields, it is determined that the sector (track) that follows this header is a land sector (land track). Then, reproduction is done according to tracking control corresponding to the land sector (land track).

As has been described above with reference to FIGS. 5 to 8, by comparing the relationship between the header 1 field (or header 2 field) and header 3 field (or header 4 field) obtained upon reproduction of the header fields, whether a land sector (land track) or groove sector (groove track) follows the header field can be determined.

The layout positions of the header fields will be explained below.

The groove and land tracks are formed by laser exposure. The headers are similarly formed by laser exposure. When a laser beam is used for forming these tracks and headers, the width of pits that define each header becomes equal to the track width. In addition, when headers are formed at identical positions along the radial direction of the optical disk without using the checkerboard layout shown in FIGS. 5 to 8, pits in the radial direction interfere with each other. That is, when the header 1 field and header 2 field, and the header 3 field and header 4 field, are at identical positions in the radial direction, pits which define the header 1 field and header 2 field, and those which define the header 3 field and header 3 field interfere with each other. As a consequence, it becomes difficult to normally reproduce header data.

In order to solve such problem, a method of preparing a laser beam for track formation independently of that for header formation may be used. The laser beam for header formation has a shorter wavelength and smaller beam spot than that for track formation. That is, the width of pits which define each header is smaller than that of the groove track.

However, when the two beams are used, a new problem, i.e., an increase in cost, is posed as compared to one beam. Furthermore, the two beams must be selectively used in correspondence with situations, and complicated control is also required.

In the present invention, since the headers form a checkerboard layout, the tracks and headers can be formed by one beam. Since the headers are located at grid positions, neighboring pits can be prevented from interfering with each other even when the track width equals the pit width. That is, using the checkerboard layout of the headers, the track and pit need not have different widths. In this connection, the track and pit shown in FIGS. 5 and 7 have the same width.

A sector located at the head of switching between groove and land tracks is called a first sector. FIGS. 7 and 8 show the header fields of the first sector. In an optical disk using a single spiral scheme, when the spiral track is tracked, the polarity of tracking switches in the order of land, groove, land, and groove. That is, the groove and land tracks must have different polarities of tracking. For this reason, the sector at the head of switching from a groove track to a land track or vice versa must have a layout different from sectors other than that at the head of switching.

The method of manufacturing an optical disk will be explained below.

A glass disk is fabricated. A photoresist is applied to the glass disk to obtain a photoresist disk. The photoresist disk is rotated, and a laser beam is irradiated onto the rotating photoresist disk, thus recording tracks and headers by exposure. At that time, the laser beam to be irradiated is one type of laser beam. That is, the tracks and headers are recorded by exposure using one beam. Upon developing the photoresist disk on which the tracks and headers have been recorded by exposure, the exposed photoresist portions are dissolved by a developing solution, thus forming tracks and headers on the photoresist disk.

Such process for forming the tracks and headers on the photoresist disk is called a cutting process, which is realized by a cutting device. That is, this cutting device has an optical head and the like for irradiating a laser beam onto the photoresist disk. The beam spot of the laser beam emitted by the optical head moves by one track pitch in the radial direction of the photoresist disk every time the photoresist disk completes one revolution. With this movement, the beam spot scans the photoresist disk in a spiral pattern. Furthermore, every time the photoresist disk completes one revolution, the laser beam emitted by the optical head is turned on/off. That is, the portion exposed upon turning on the laser beam becomes a groove track, and portion not exposed upon turning off the laser beam becomes a land track. Consequently, groove and land tracks alternate every round.

In addition, the laser beam irradiated to form a groove track is modulated by a signal corresponding to sinusoidal oscillations having a period of 186 channel bits. Hence, the track formed has a wobble shape, as shown in FIGS. 6 and 8. Also, the laser beam emitted by the optical head is modulated so that it shifts by a half track pitch in the radial direction of the photoresist disk at a predetermined timing. With this modulation, pits that define a header are formed. Note that the signal corresponding to sinusoidal oscillations having a period of 186 channel bits can be used as a reference signal for generating clocks upon data write.

A metal is deposited onto the photoresist disk formed with the tracks and headers to obtain a master disk. An Ni-plating layer is formed on the master disk, and is peeled therefrom.

The peeled Ni-plating layer serves as a mold for an optical disk called a stamper. An optical disk is manufactured using the stamper as a mold.

Figure 9:
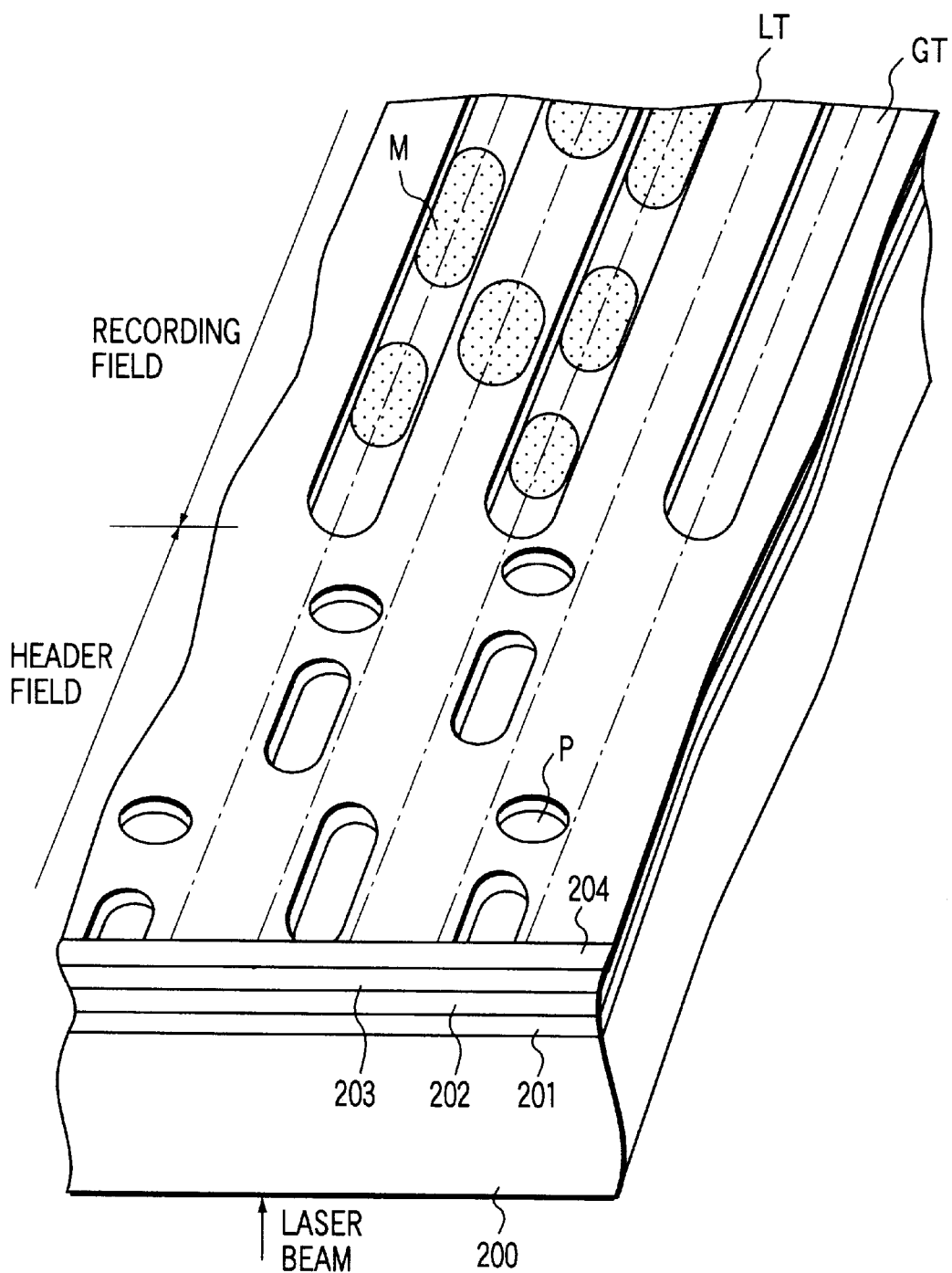
FIG. 9 is a view showing a section of the optical disk.

The structure of the optical disk will be described below with reference to FIG. 9.

A substrate 200 of the optical disk is formed of a transparent material such as plastic or the like. Header and recording fields are recorded on this substrate 200. Also, header data is recorded on the header field by emboss pits P. Groove tracks GT and land tracks LT are formed on the recording field.

When viewed from the reproduction laser beam incoming side, each emboss pit P projects, groove track GT projects, and land track LT recedes. A protection film 201, recording film 202, protection film 203, and reflection film 204 are formed on the three-dimensional recording surface of the substrate 200 in turn from the substrate 200 side. The one-dashed chain line in FIG. 9 indicates the center of the groove track GT or land track LT. The emboss pits P that form each header field are located on lines shifted by a half track pitch from the central line of the groove track GT and land track LT.

Figure 10:
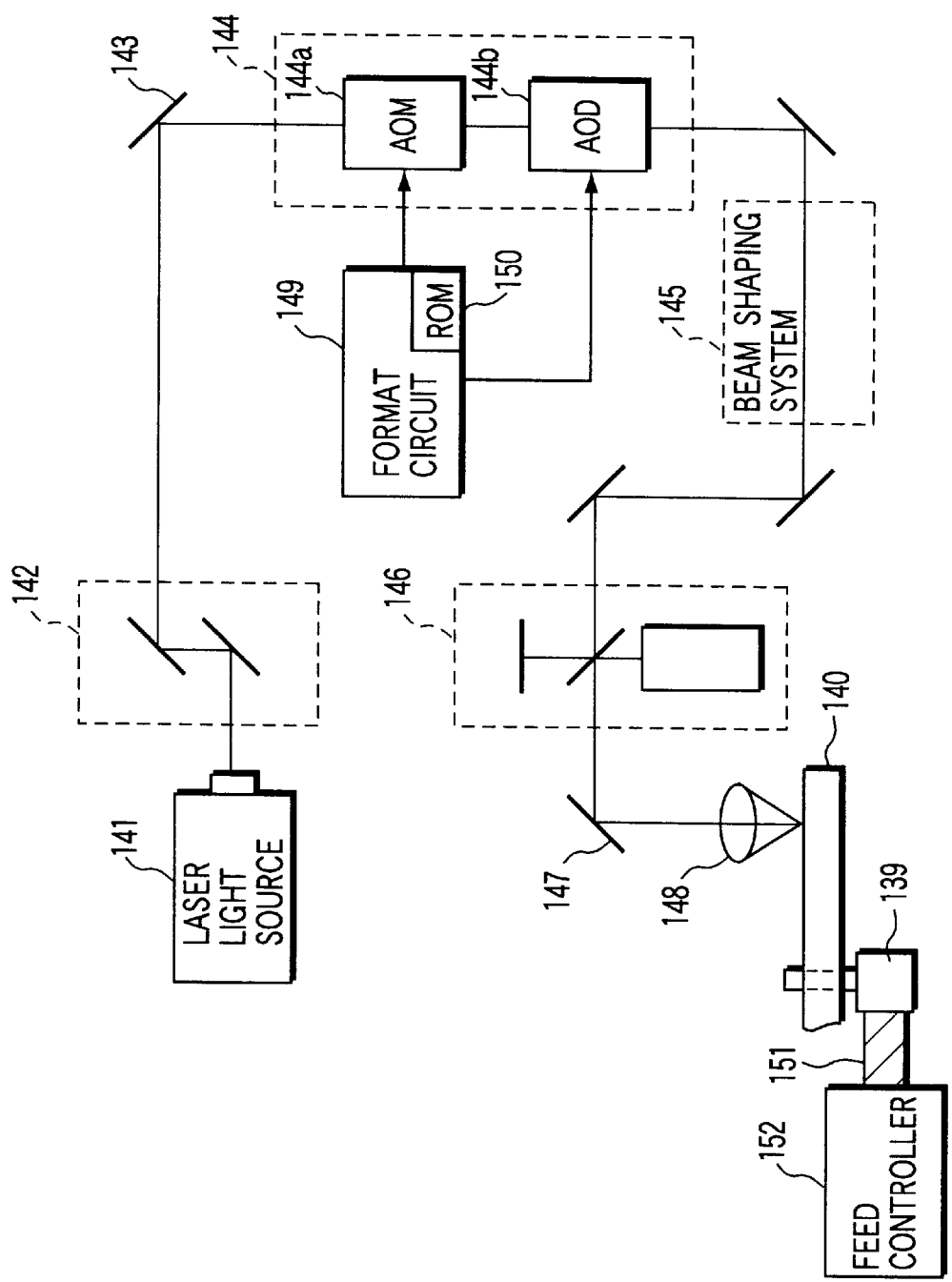
FIG. 10 is a schematic block diagram showing the arrangement of a cutting device.
Figure 11:
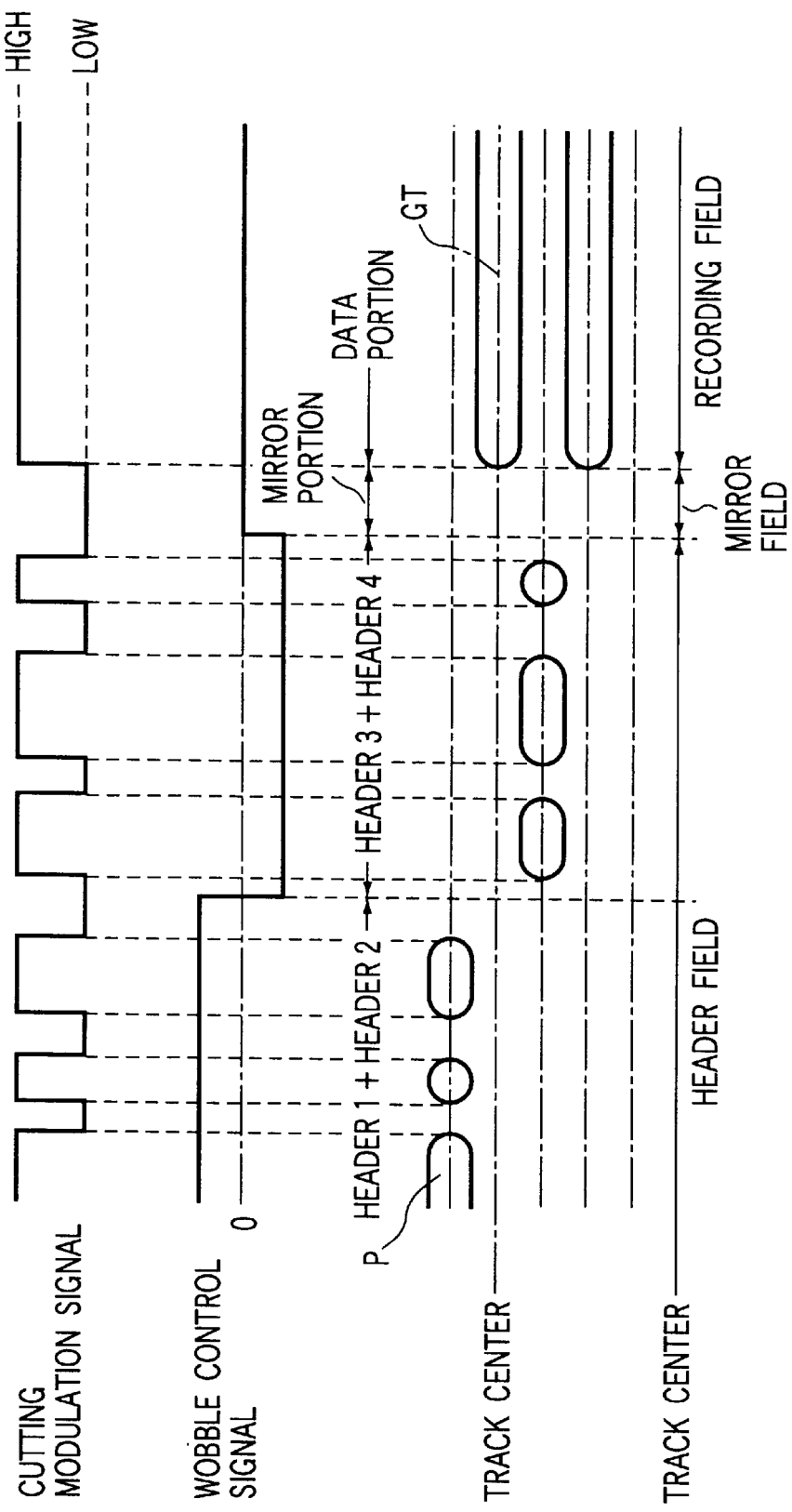
FIG. 11 is a chart for explaining a cutting modulation signal and wobble control signal generated by a format circuit of the cutting device.

The cutting device according to an embodiment of the present invention will be explained below with reference to FIGS. 10 and 11. FIG. 10 is a schematic block diagram showing the arrangement of the cutting device. FIG. 11 is a chart for explaining a cutting modulation signal and wobble control signal generated by a format circuit of the cutting device.

The schematic arrangement of the cutting device will be described first with reference to FIG. 10. A laser beam (Ar or Kr laser) emitted by a laser light source 141 enters a laser optical axis control system 142 for adjusting the optical axis. The laser optical axis control system 142 adjusts the optical axis of the laser beam. The laser beam that leaves the laser optical axis control system 142 is reflected by a mirror 143, and enters a beam modulation system 144 controlled by a format circuit 149.

The beam modulation system 144 is constructed by an acoustooptic modulator (AOM) 144a and an acoustooptic deflector (AOD) 144b. The AOM 144a modulates the laser beam in accordance with a cutting modulation signal and wobble control signal supplied from the format circuit 149. The AOD 144b deflects the laser beam in accordance with a deflection signal supplied from the format circuit 149. The format circuit 149 has a ROM 150, and generates a cutting signal for determining the laser output and exposure portion, and a wobble control signal indicating the wobble amount and direction. Note that the ROM 150 will be described in detail later.

The laser beam that enters the beam modulation system 144 is modulated by the AOM 144a, and is deflected by the AOD 144b. The laser beam that exits the beam modulation system 144 enters a beam shaping system 145 which comprises a pinhole or slit. The beam shaping system 145 adjusts the beam size and shape of the laser beam. The laser beam that leaves the beam shaping system 145 enters a beam monitor system 146. The beam monitor system 146 monitors the beam shape of the laser beam.

The laser beam output from the beam monitor system 146 is guided by a mirror 147, and is focused and irradiated onto a photoresist disk 140 via an objective lens 148. The photoresist disk 140 is prepared by forming a photoresist coat on a glass disk. That portion of the photoresist disk on which the laser beam is irradiated has a recessed shape by etching.

Upon cutting, the photoresist disk 140 is rotated at a constant speed by a spindle motor 139. Furthermore, the photoresist disk 140 is moved in a predetermined direction by a feed screw 151 while being integrated with the spindle motor 139. With this movement, the laser beam irradiated via the objective lens 148 moves from the inner periphery side toward the outer periphery side of the photoresist disk 140. In this connection, the feed screw 151 moves the photoresist disk 140 integrated with the spindle motor 139 under the control of a feed controller 152. Under the control of the feed controller 152, the beam spot of the laser beam moves by the track pitch per revolution of the photoresist disk 140. When the laser beam moves in this way, the irradiated portion becomes a groove track, and the non-irradiated portion becomes a land track. Furthermore, by turning on/off the laser beam, emboss pits that form header fields are formed. 8–16 modulation in the cutting device of the present invention will be explained below.

The 8–16 modulation converts an 8-bit input code sequence (to be referred to as source data hereinafter) into a 16-bit output code sequence (to be referred to as converted code hereinafter) in accordance with a modulation table. The characteristic feature of the 8–16 modulation lies in that 2 to 10 "0" bits are present between two "1" bits in the converted code sequence. That is, the converted code converted by the 8–16 modulation is expressed by RLL (2, 10). Note that RLL is an abbreviation for Run Length Limited.

Data (header data and recording data) recorded on an optical disk (DVD-RAM disk) are 8–16 modulated except for specific data (VFO, AM, PA, and the like). Upon 8–16 modulation, a plurality of modulation tables are selectively used to make the digital sum value level close to zero. Note that the digital sum value is obtained by calculating the sum of symbols (symbol 1=+1 point; symbol 0=−1 point). The digital sum value is used as a measure upon evaluating the DC components of the modulated signal; as the absolute value of the digital sum value is smaller, there are fewer DC components or low-frequency components. Hence, as the absolute value of the digital sum value is smaller, the reproduction precision becomes higher. However, depending on the source data, the absolute value of the digital sum value does not decrease, but monotonously increases or decreases. In such case, data cannot be normally reproduced. In order to avoid such situation, a plurality of modulation tables are selectively used to attain 8–16 modulation.

However, in one header field of the header data, the data (PID, IED) to be 8–16 modulated are only around 6 bytes. The digital sum value as small as around 6-byte data does not carry much significance. Hence, in the present invention, 8–16 modulation for header data is realized by one modulation table. For example, 8–16 modulation for header data is realized by only a modulation table (main table) shown in FIG. 12.

By contrast, the data (recording data and the like) to be subjected to 8–16 modulation in the recording field are huge in volume, and the digital sum value of such huge volume of data carries much significance. Hence, in the present invention, 8–16 modulation for recording data is realized by selectively using a plurality of modulation tables. For example, 8–16 modulation for recording data is realized by the modulation table (main table) shown in FIG. 12 and that (sub table) shown in FIG. 13.

FIGS. 12 and 13 show examples of the modulation tables, in which FIG. 12 shows a main table, and FIG. 13 shows a sub table. The main table is used for converting source data ranging from 0 to 255 expressed in decimal notation. The sub table is used for converting source data ranging from 0 to 87.

Hence, when source data ranging from 0 to 87 in the recording data is converted, one of the main and sub tables must be selected. More specifically, a table that can obtain a smaller absolute value of the digital sum value is selected.

In FIGS. 12 and 13, the numerical values (0 to 255 or 0 to 87) in the leftmost column are source data. In practice, 8-bit source data is processed. State 1, 2, 3, and 4 conversion codes corresponding to the source data are listed in turn in the right columns. Furthermore, in the right column of each conversion code column, next state (1, 2, 3, or 4) is added. Note that "next state" means the next state literally, i.e., indicates the state of a conversion code to be used after the conversion code of the interest is used. Some codes repetitively appear in States 1 to 4.

The ROM 150 included in the format circuit 149 will be explained below. The ROM 150 stores modulation tables for realizing 8–16 modulation. To restate, in the present invention, 8–16 modulation for header data is done by using one modulation table. For example, the ROM 150 stores the modulation table shown in FIG. 12 alone. In this way, the header data are modulated by only the modulation table shown in FIG. 12.

That is, using the checkerboard header layout shown in FIGS. 5 to 8, tracks and headers can be formed by one beam, and the cutting device can be greatly simplified. Furthermore, since 8–16 modulation is done by one modulation table, the load on the cutting device can be reduced.

The cutting modulation signal and wobble control signal generated by the format circuit 149 will be explained below with reference to FIG. 11.

The cutting modulation signal is used as a modulation signal for the laser light source 141 in the cutting device. In FIG. 11, assume that the level of the cutting modulation signal is proportional to the output of the laser beam.

The wobble control signal controls the deflection angle in the AOD 144b for shifting the beam position. If the wobble control signal is larger than zero level, the beam irradiation position shifts upward with respect to the central position of the track. On the other hand, if the wobble control signal is smaller than zero level, the beam irradiation position shifts downward with respect to the central position of the track.

As shown in FIG. 11, in a portion where the wobble control signal is larger than zero level, i.e., a portion of the header 1 field and header 2 field, the beam irradiation position shifts upward from the central position of the track. On the other hand, in a portion where the wobble control signal is smaller than zero level, i.e., a portion of the header 3 field and header 4 field, the beam irradiation position shifts downward from the central position of the track. In a portion where the wobble control signal is zero level, i.e., a portion of the recording field, a groove is formed at the central position of the track.

On the other hand, when the cutting modulation signal is at High level, a recess is formed on the master disk. Hence, when the cutting modulation signal is at High level, emboss pits and groove tracks are formed.

Figure 14:
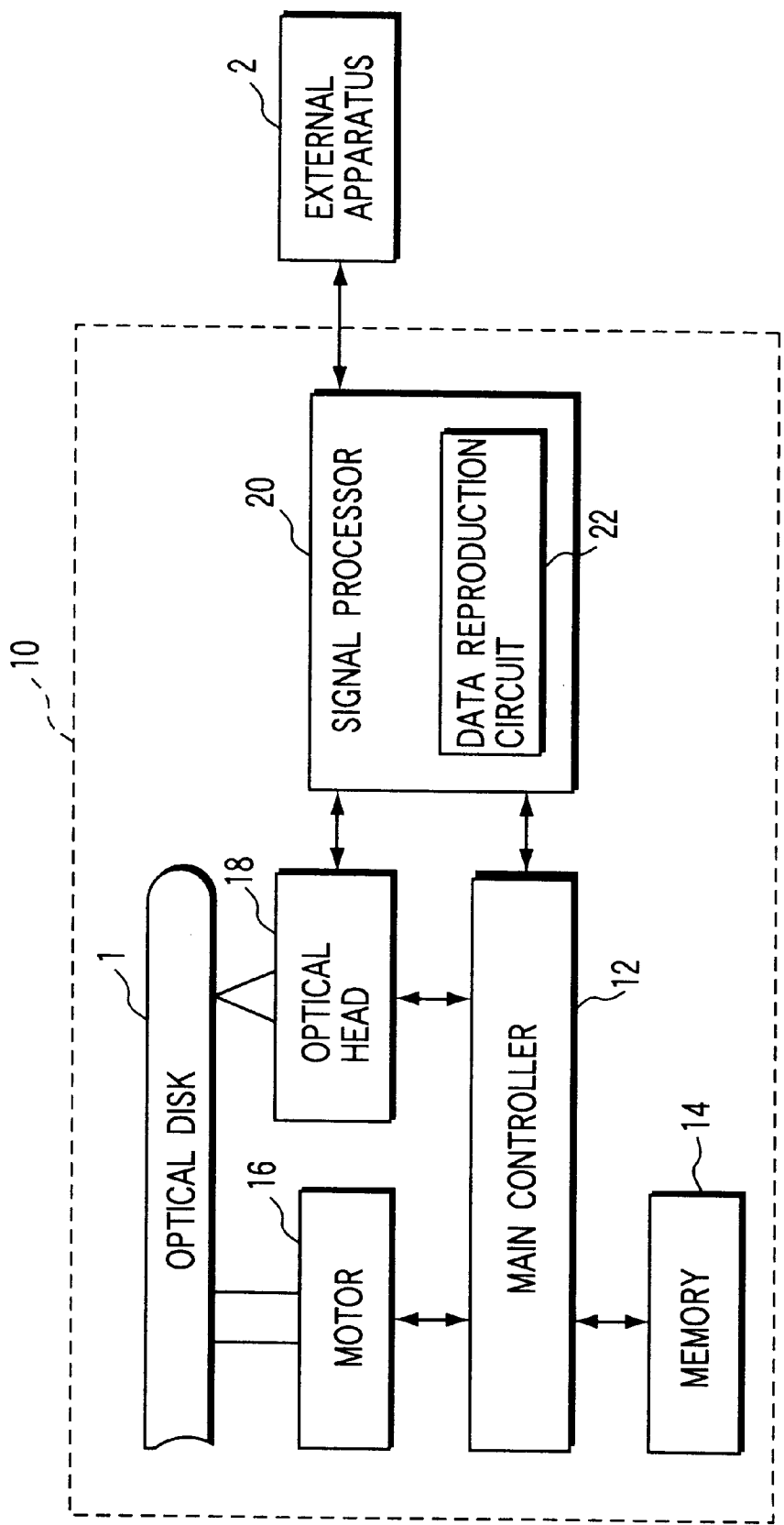
FIG. 14 is a schematic block diagram showing the arrangement of an optical disk apparatus.
Figure 15:
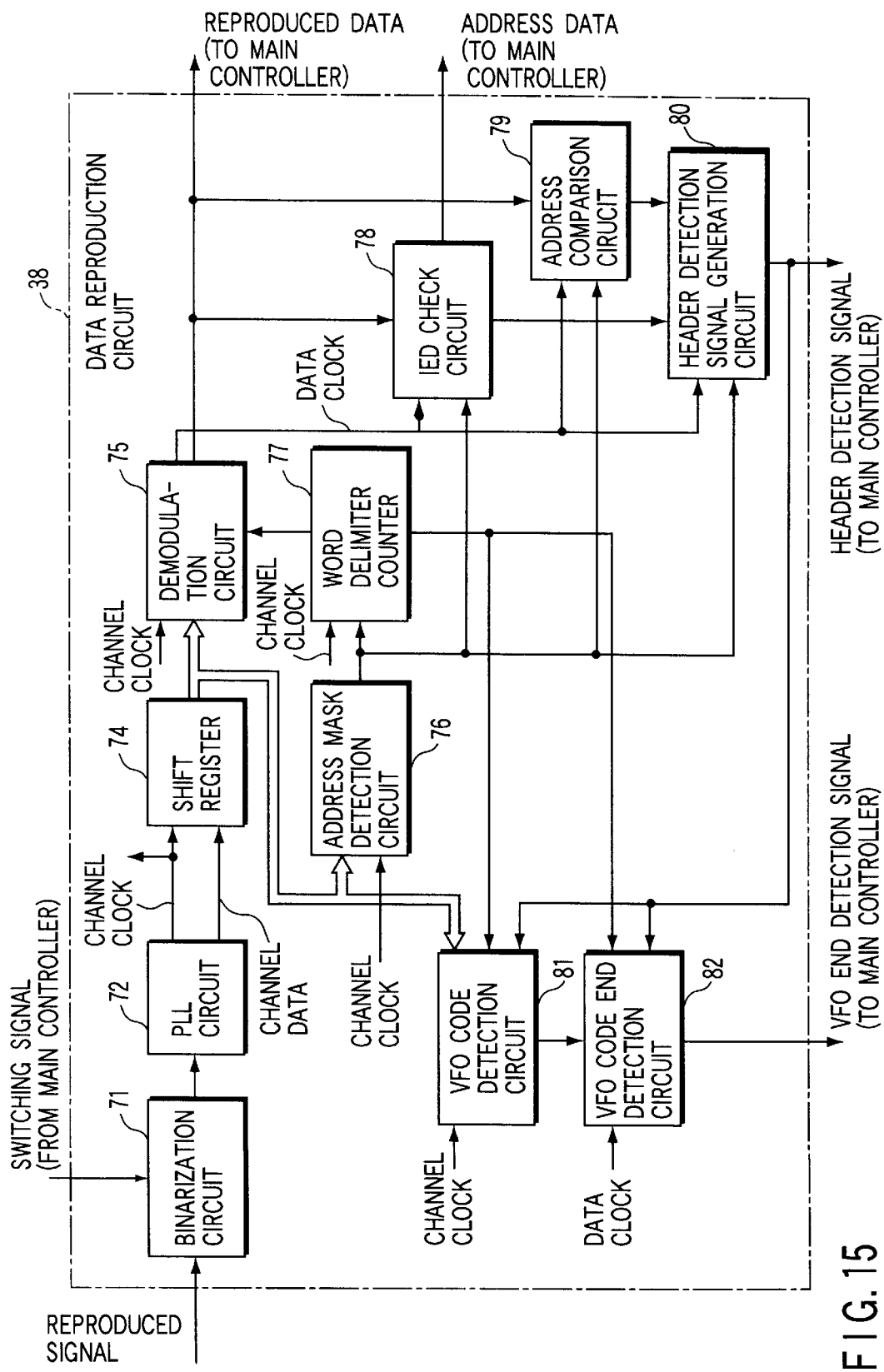
FIG. 15 is a schematic block diagram showing a data reproduction circuit of the optical disk apparatus.
Figure 16:
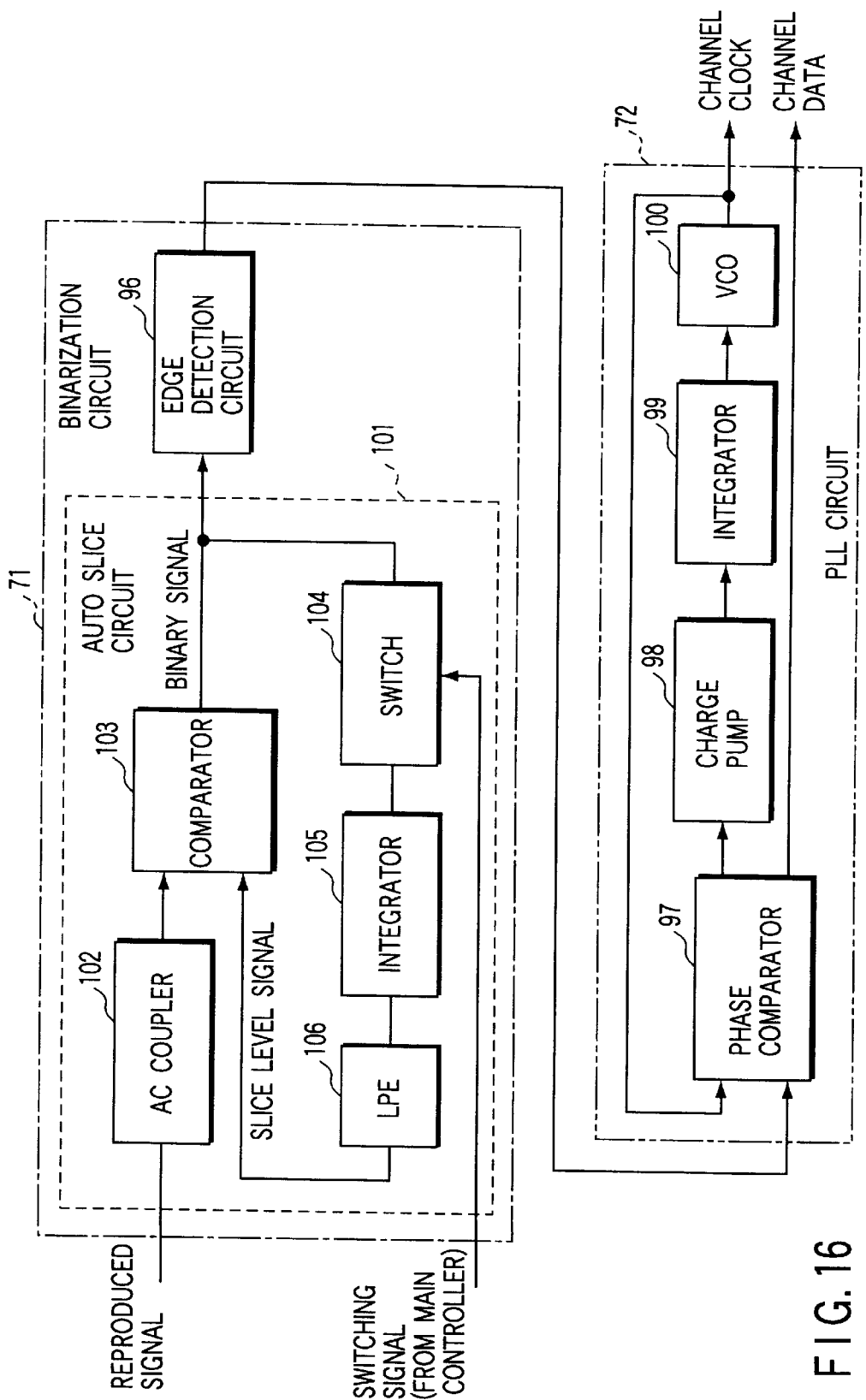
FIG. 16 is a schematic block diagram showing the arrangement of a binarization circuit and PLL circuit in the data reproduction circuit.
Figure 17:
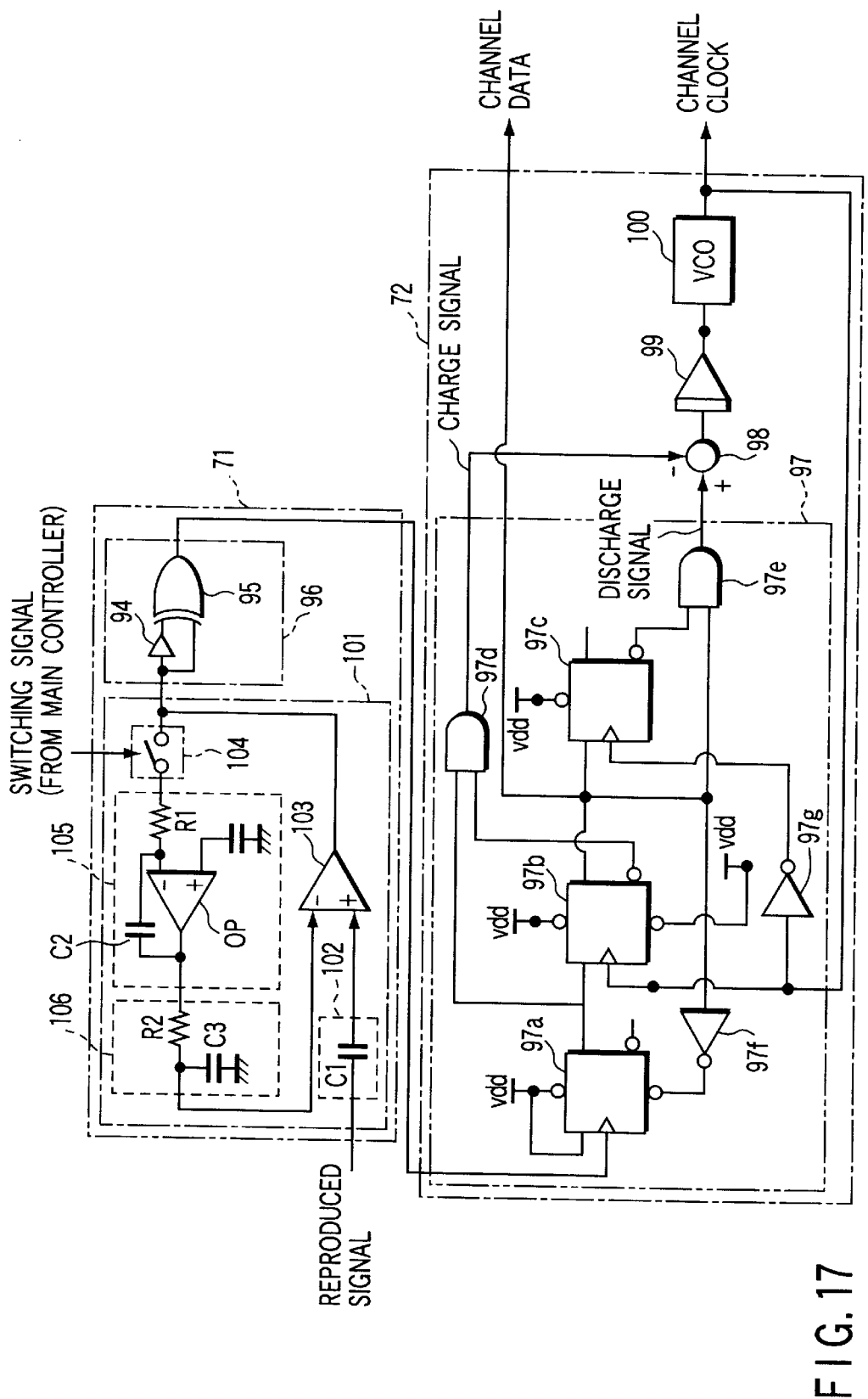
FIG. 17 is a schematic circuit diagram showing the arrangement of the binarization circuit and PLL circuit in the data reproduction circuit.
Figure 19:
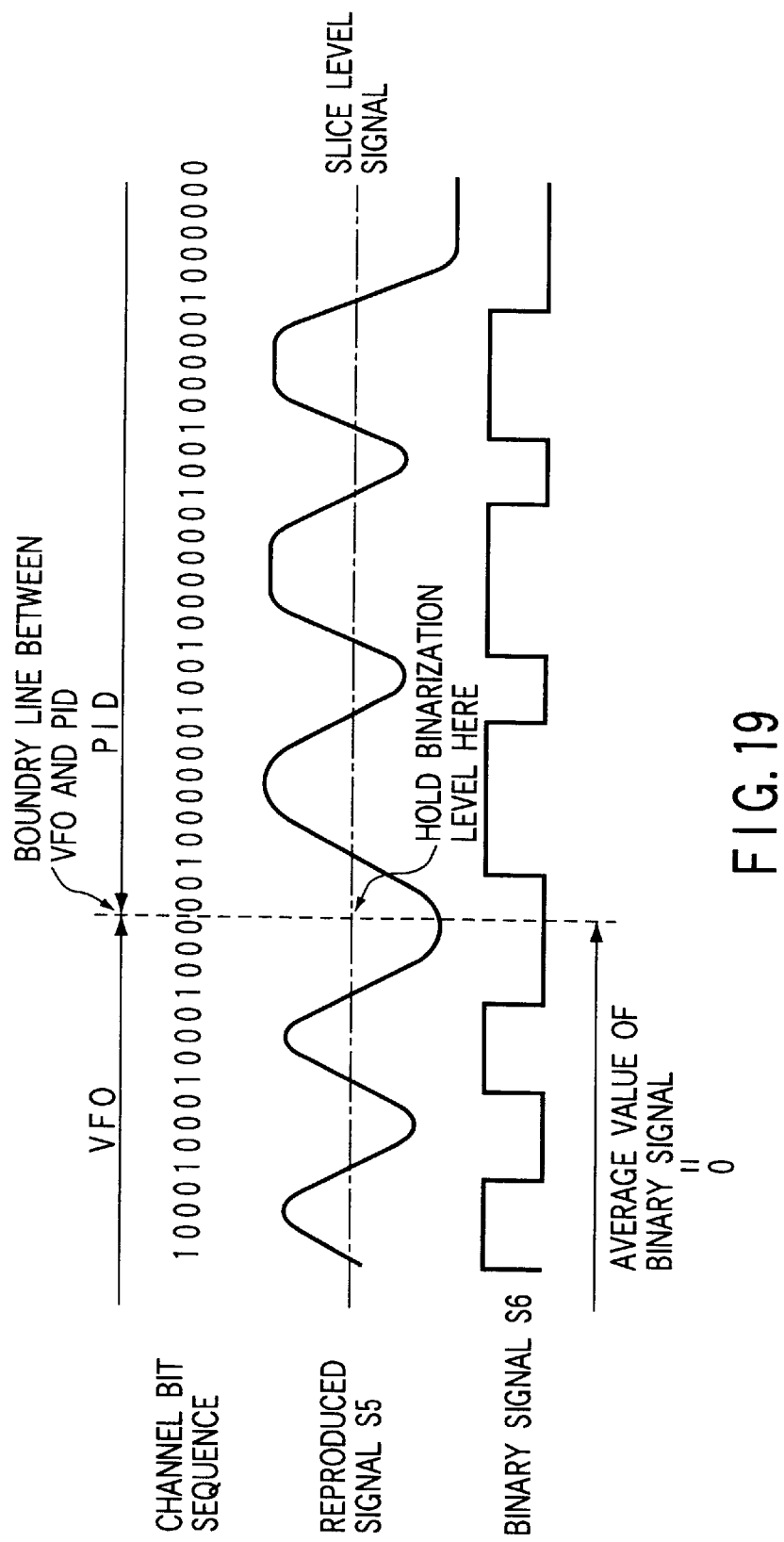
FIG. 19 is a chart for explaining a slice level signal generated from a reproduced signal of a VFO field.

The optical disk apparatus will be explained below with reference to FIGS. 14 to 19. FIG. 14 is a schematic diagram showing the arrangement of an optical disk apparatus. FIG. 15 is a schematic diagram showing the arrangement of a data reproduction circuit of the optical disk apparatus. FIG. 16 is a schematic block diagram showing the arrangement of a binarization circuit and PLL circuit in the data reproduction circuit. FIG. 17 is a schematic circuit diagram showing the arrangement of the binarization circuit and PLL circuit in the data reproduction circuit. FIG. 18 shows the generation process of a binary signal from a reproduced signal. FIG. 19 is a chart for explaining a slice level signal generated from a reproduced signal of the VFO field.

The schematic arrangement of the optical disk apparatus will be explained first with reference to FIG. 14.

An optical disk apparatus 10 irradiates a convergent light beam onto an optical disk 1, receives light reflected by the optical disk 1, and reproduces data recorded on the optical disk 1, which is reflected in the received reflected light. The optical disk apparatus 10 irradiates a light beam that reflects recording data onto the optical disk 1, and records the recording data on the optical disk 1.

As shown in FIG. 14, the optical disk apparatus 10 includes a main controller 12, memory 14, motor 16, optical head 18, signal processor 20, and data reproduction circuit 22.

Processing for recording data generated by an external apparatus 2 (personal computer or the like) on the optical disk 1 by the optical disk apparatus 10 will be explained below. The motor 16 rotates the optical disk 1 at a predetermined speed under the control of the main controller 12. More specifically, the memory 14 stores a rotation speed table that defines the rotation speeds in units of zones, as shown in FIG. 2, and the main controller 12 controls rotation of the optical disk 1 on the basis of this rotation speed table. Data generated by the external apparatus 2 is transmitted to the signal processor 20. The signal processor 20 generates recording data by modulating the data transmitted from the external apparatus 2 in accordance with 8–16 modulation. More specifically, the memory 14 stores the modulation tables shown in FIGS. 12 and 13, and the signal processor 20 modulates according to 8–16 modulation by appropriately selectively using these two tables. An optical head 18 has a semiconductor laser (not shown), which emits a recording light beam, that reflects the recording data. The optical head 18 is subjected to tracking control and focus control by the main controller 12. With this control, the recording light beam emitted by the semiconductor laser is focused at a predetermined position on the optical disk 1. As a result, the recording data is recorded at the predetermined position on the optical disk 1.

Subsequently, reproduction for reproducing data recorded on the optical disk 1 and outputting the reproduced data to the external apparatus 2 by the optical disk apparatus 10 will be explained below. The motor 16 rotates the optical disk 1 at a predetermined speed under the control of the main controller 12. More specifically, the main controller 12 controls rotation of the optical disk 1 on the basis of the rotation speed table recorded in the memory 14. The semiconductor laser in the optical head 18 emits a reproduction light beam. The optical head 18 is subjected to tracking control and focus control by the main controller 12. With this control, the reproduction light beam emitted by the semiconductor laser is focused at a predetermined position on the optical disk 1. The reflected light of the reproduction light beam focused on the optical disk 1 reflects data recorded on the optical disk 1. The reflected light is detected by a photodetector (not shown) included in the optical head 18. The detection result of the reflected light detected by the photodetector is passed to the signal processor 20 as a reproduced signal. The data reproduction circuit 22 included in the signal processor 20 generates reproduced data on the basis of the reproduced signal, and outputs it to the external apparatus 2.

The schematic arrangement of the circuit 22 will be explained below with reference to FIG. 15.

The data reproduction circuit 22 includes a binarization circuit 71, PLL circuit 72, shift register 74, demodulation circuit 75, address mark detection circuit 76, word delimiter counter 77, IED check circuit 78, address comparison circuit 79, header detection signal generation circuit 80, VFO code detection circuit 81, and VFO code end detection circuit 82.

The binarization circuit 71 includes an auto slice circuit 101 and edge detection circuit 96, as shown in FIGS. 16 and 17.

The auto slice circuit 101 comprises an AC coupler 102, comparator 103, switch 104, integrator 105, and low-pass filter (LPF) 106. The AC coupler 102 comprises a capacitor Cl. The comparator 103 serves as a binarization means for outputting a binary signal, and comprises a comparator. The integrator 105 serves as a generation means for generating a slice level signal, and comprises a resistor R1, capacitor C2, operational amplifier OP, and constant voltage source E. The LPF 106 comprises a resistor R2 and capacitor C3.

The reproduced signal passed from the photodetector in the optical head 18 is input to the non-inverting input terminal (+) of the comparator 103 via the AC coupler 102. A binary signal as the output signal from the comparator 103 is supplied to the edge detection circuit 96. Furthermore, the binary signal as the output signal from the comparator 103 is supplied as a slice level signal (digital sum value) to the inverting input terminal (−) of the comparator 103 via the switch 104, integrator 105, and LPF 106. That is, the comparator 103 compares the reproduced signal supplied via the AC coupler 102, and the slice level signal generated based on its output signal, and outputs the comparison result (binary signal). The voltage charged on the capacitor C2 of the integrator 105 is discharged upon turning on the switch 104. This switch 104 is turned on in response to a switching signal (reset signal) output from the main controller 12.

When a reproduced signal of the VFO field in the header field is supplied to the comparator 103, the switching signal is supplied to the switch 104 to turn it on. In this way, the slice level signal is generated based on the reproduced signal of the VFO field. That is, the reproduced signal of the VFO field is binarized by the slice level signal generated from the reproduced signal of the VFO field.

On the other hand, when a reproduced signal of fields other than the VFO field, e.g., a reproduced signal of the PID field, IED field, and the like is supplied to the comparator 103, no switching signal is supplied to the switch 104 to keep it off. In this manner, the slice level signal generated from the reproduced signal of the VFO field is held. That is, the reproduced signal of the PID and IED fields is binarized by the slice level signal generated from the reproduced signal of the VFO field.

Note that the reason and effects obtained by binarizing the reproduced signal of the PID and IED fields by the slice level signal generated from the reproduced signal of the VFO field will be explained in detail later.

In order to output the switching signal at the aforementioned timing, at least the end of the VFO field in the header field must be detected. The end of the VFO field in the header field is detected based on a header detection signal output from the header detection signal generation circuit 80 and a VFO code end detection signal output from the VFO code end detection circuit 82. The header detection signal and VFO code end detection signal are supplied to the main controller 12. Note that the header detection signal generation circuit 80 and VFO code end detection circuit 82 will be described in detail later.

The edge detection circuit 95 includes a delay circuit 94 and logic circuit 95. The delay circuit 94 delays the binary signal output from the comparator 103 by a predetermined period of time. The logic circuit 95 EX-ORs the delayed output from the delay circuit 94, and the binary signal output from the comparator 103 to detect the edge of the binary signal, thereby outputting an edge detection signal.

As shown in FIG. 18, the auto slice circuit 101 generates a binary signal S2 on the basis of a reproduced signal S1. The edge detection circuit 96 detects the edge of the binary signal S2 output from the auto slice circuit 101, and generates an edge detection signal S3 as shown in FIG. 18. The edge detection signal S3 output from the edge detection circuit 96 is sent to the PLL circuit 72.

The PLL circuit 72 generates a channel clock and channel data on the basis of the edge detection signal S3 output from the edge detection circuit 96. As shown in FIGS. 16 and 17, the PLL circuit 72 comprises a phase comparator 97, charge pump 98, integrator 99, and voltage controlled oscillator (VCO) 100. The PLL circuit 72 locks PLL servo at both the trailing and leading edges of the edge detection signal S3.

The phase comparator 97 is a lock-in type phase comparator, and compares the edge detection signal output from the edge detection circuit 96 and a clock signal supplied from the VCO 100 to output a signal having a pulse width proportional to the compared phase difference. Data (channel data) synchronous with the clock signal, which data is output from the phase comparator 97, is output to the shift register 74.

The phase comparator 97 comprises three flip-flop circuits 97a, 97b, and 97c, two AND gates 97d and 97e, and two inverter circuits 97f and 97g. An output signal from the AND gate 97d serves as a charge signal, and an output signal from the AND gate 97e serves as a discharge signal. These signals are output to the charge pump 98.

The charge pump 98 comprises a subtractor for subtracting the charge signal from the discharge signal, which are supplied from the phase comparator 97. The difference output from the charge pump 98 is integrated by the integrator 99, and is output to the VCO 100.

The VCO 100 outputs a binary clock signal (channel clock C) having a frequency proportional to the voltage value (analog value) of the signal supplied from the integrator 99, as shown in FIG. 18.

The channel clock C output from the VCO 100 is output to the phase comparator 97, and also to the shift register 74, demodulation circuit 75, address mark detection circuit 76, and word delimiter counter 77.

The shift register 74 converts the received channel data into 16-bit parallel data, and outputs it. The 16-bit channel data output from the shift register 74 is supplied to the demodulation circuit 75 and address mark detection circuit 76.

The demodulation circuit 75 demodulates in accordance with the 8–16 modulation rules on the basis of the modulation table stored in the memory 14 shown in FIG. 14. The data demodulated by the demodulation circuit 75 is output as reproduced data to the external apparatus 2. Furthermore, the reproduced data is output to the IED check circuit 78 and address comparison circuit 79. The data clock generated by the demodulation circuit 75 is output to the IED check circuit 78, address comparison circuit 79, and header detection signal generation circuit 80.

The address mark detection circuit 76 comprises a comparator. Every time the address mark detection circuit 76 receives the channel clock from the PLL circuit 72, it detects by comparison if the 16-bit channel data supplied from the shift register 74 matches a 16-bit address mark, and outputs an address mark detection circuit when the two data match each other. The address mark detection signal output from the address mark detection circuit 76 is output to the word delimiter counter 77, IED check circuit 78, address comparison circuit 79, and header detection signal generation circuit 80.

The word delimiter counter 77 starts counting in response to the address mark detection signal from the address mark detection circuit 76 as a trigger, and outputs a word delimiter signal every 16-channel bits. The word delimiter signal output from the word delimiter counter 77 is supplied to the demodulation circuit 75.

After the IED check circuit 78 receives the address mark detection signal from the address mark detection circuit 76, it accepts reproduced data corresponding to the PID and IED supplied from the demodulation circuit 75 on the basis of the data clock supplied from the demodulation circuit 75. The IED check circuit 78 checks based on the IED if the PID is normally reproduced. The check result of the IED check circuit 78 is supplied to the header detection signal generation circuit 80.

After the address comparison circuit 79 receives the address mark detection signal from the address mark detection circuit 76, it accepts the PID supplied from the demodulation circuit 75 on the basis of the data clock supplied from the demodulation circuit 75, detects by comparison which one of "1" to "4" the ID number contained in the accepted PID corresponds to, and outputs a signal corresponding to the matched ID number. The signal corresponding to the ID number output from the address comparison circuit 79 is supplied to the header detection signal generation circuit 80. For example, when the ID number is "1", the circuit 79 outputs "00"; when the ID number is "2", it outputs "01"; when the ID number is "3", it outputs "0"; and when the ID number is "4", it outputs "11". Also, the address comparison circuit 79 outputs the accepted PID as address data to the main controller 12.

When the check result from the IED check circuit 78 is normal, the header detection signal generation circuit 80 generates a header detection signal at the end of a mirror mark area in accordance with the signal corresponding to the ID number supplied from the address comparison circuit 79, the address mark detection signal supplied from the address mark detection circuit 76, and the data clock supplied from the demodulation circuit 75. The header detection signal generation circuit 80 comprises, e.g., a binary counter for counting the number of bytes after reception of the address mark detection signal on the basis of the data clock from the demodulation circuit 75. The header detection signal from the header detection signal generation circuit 80 is output to the main controller 12. For example, when the check result is normal and the signal indicating ID number "1" is received, the circuit 80 generates a header detection signal 94 bytes after it has received the address mark detection signal from the address mark detection circuit 76. When the check result is normal and the signal indicating ID number "2" is received, the circuit 80 generates a header detection signal 76 bytes after it has received the address mark detection signal from the address mark detection circuit 76. When the check result is normal and the signal indicating ID number "3" is received, the circuit 80 generates a header detection signal 30 bytes after it has received the address mark detection signal from the address mark detection circuit 76. Also, when the check result is normal and the signal indicating ID number "4" is received, the circuit 80 generates a header detection signal 12 bytes after it has received the address mark detection signal from the address mark detection circuit 76.

The VFO code detection circuit 81 comprises a byte counter and comparator. The VFO code detection circuit 81 counts the number of bytes with reference to the header detection signal from the header detection signal generation circuit 80, detects by comparison if the 16-bit channel data from the shift register 74 matches a 16-bit VFO code pattern, and outputs a VFO code detection signal to the VFO code end detection circuit 82, when they match each other.

The VFO code end detection circuit 82 outputs a VFO code end detection signal to the main controller 12 at the timing when the VFO code detection circuit 81 ceases to supply the VFO code detection signal. In this connection, the main controller 12 does not output any switching signal to the switch 104 in the auto slice circuit 101 after it receives the VFO code end detection signal.

The slice level signal in the header field will be explained below with reference to FIG. 19.

The VFO field records a continuous repetitive pattern (100010001000. . . ), as shown in FIG. 19. On the other hand, the PID field records a channel bit sequence indicating the sector address.

A signal obtained from the VFO and PID fields becomes a reproduced signal S5. The one-dashed chain line above the reproduced signal S5 represents an ideal slice level signal. A signal obtained. by binarizing the reproduced signal S5 by this slice level signal is a binary signal S6.

The VFO field records a continuous repetitive pattern. For this reason, the average value of the waveform of the VFO field becomes approximately zero. In the header field, only data in the PID and IED fields are recorded as modulated codes modulated by 8–16 modulation. Hence, by holding the slice level signal obtained from the VFO field, and using it as the entire slice level signal, stable binarization can be done.

When such binarization is done, the digital sum value of the PID and IED fields is not so significant. That is, 8–16 modulation need not be executed by selectively using a plurality of modulation tables unlike in the prior art. When such binarization is done, 8–16 modulation can be realized by only one modulation table.

The cutting device shown in FIG. 10 executes 8–16 modulation using only one modulation table to record header fields. With such binarization, the need for selectively using a plurality of modulation tables can be obviated, and as a consequence, the arrangement of the cutting device can be simplified.

The band of a binarization control loop in the VFO and PID fields will be explained below. The loop band is switched in the VFO field to realize quick lead-in of the VFO field. For example, the band is switched to ⅟10 at the middle point of the VFO field (100 kHz→10 kHz). The switched band applies to the PID field.

The effects of the present invention can be summarized as follows.

According to the present invention, an information recording medium which can prevent low reproduction precision of header data resulting from high-density recording can be provided.

Also, according to the present invention, an information recording medium which can help simplifying a cutting device can be provided.

Furthermore, according to the present invention, an information reproduction apparatus which can stably reproduce data can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information reproduction apparatus comprising:

an extraction device for extracting a reproduced signal that reflects data recorded on an information recording medium; and a reproduction device for generating a slice level signal based on a predetermined signal included in the reproduced signal extracted by said extraction device, generating a binary signal obtained by binarizing the reproduced signal based on the slice level signal, and reproducing the data recorded on said information recording medium based on the binary signal, wherein said extraction device comprises:

a reproduced signal generation device for generating the reproduced signal, which reflects data recorded on an information recording medium having a header field containing address data, and a recording field containing recording data, from said information recording medium, and said reproduction device comprises:

a slice level signal generation device for generating the slice level signal based on a predetermined signal included in a reproduced signal of said header field in the reproduced a signal generated by said reproduced signal generation device;

a binary signal generation device for generating the binary signal by binarizing the reproduced signal generated by said reproduced signal generation device based on the slice level signal generated by said slice level signal generation device; and a data reproduction device for reproducing data recorded on said information recording medium based on the binary signal generated by said binary signal generation device.

2. An information reproduction apparatus comprising:

an extraction device for extracting a reproduced signal that reflects data recorded on an information recording medium; and a reproduction device for generating a slice level signal based on a predetermined signal included in the reproduced signal extracted by said extraction device, generating a binary signal obtained by binarizing the reproduced signal based on the slice level signal, and reproducing the data recorded on said information recording medium based on the binary signal, wherein said extraction device comprises:

an irradiation device for irradiating a light beam onto an information recording medium having a header field containing a synchronization code and address data, and a recording field containing recording data;

a light receiving device for receiving the light beam irradiated by said irradiation device and reflected by said information recording medium;

a reflected light detection device for detecting the reflected light beam received by said light receiving device; and a reproduced signal generation device for generating the reproduced signal that reflects data recorded on said information recording medium based on a detection result of the reflected light by said detection device, and said reproduction device comprises:

a slice level signal generation device for generating the slice level signal based on a reproduced signal of the synchronization code included in the reproduced signal generated by said reproduced signal generation device;

a binary signal generation device for generating a binary signal by binarizing the reproduced signal generated by said reproduced signal generation device based on the slice level signal generated by said slice level signal generation device; and a data reproduction device for reproducing data recorded on said information recording medium based on the binary signal generated by said binary signal generation device.

3. An information reproduction apparatus comprising:

an extraction device for extracting a reproduced signal that reflects data recorded on an information recording medium; and a reproduction device for generating a slice level signal based on a predetermined signal included in the reproduced signal extracted by said extraction device, generating a binary signal obtained by binarizing the reproduced signal based on the slice level signal, and reproducing the data recorded on said information recording medium based on the binary signal, wherein said extraction device comprises:

an irradiation device for irradiating a light beam onto an information recording medium having a header field containing a synchronization code and address data, and a recording field containing recording data;

a light receiving device for receiving the light beam irradiated by said irradiation device and reflected by said information recording medium;

a reflected light detection device for detecting the reflected light beam received by said light receiving device; and a reproduced signal generation device for generating the reproduced signal that reflects data recorded on said information recording medium based on a detection result of the reflected light by said detection device, and said reproduction device comprises:

a synchronization code detection device for detecting a reproduced signal of the synchronization code from the reproduced signal generated by said reproduced signal generation device;

a slice level signal generation device for generating the slice level signal based on the reproduced signal of the synchronization code detected by said synchronization code detection device;

a binary signal generation device for generating a binary signal by binarizing a reproduced signal of the address signal included in the reproduced signal generated by said reproduced signal generation device based on the slice level signal generated by said slice level signal generation device; and a data reproduction device for reproducing data recorded on said information recording medium based on the binary signal generated by said binary signal generation device.

* * * * *